US012771409B2

(12) United States Patent
Raghavan et al.

(10) Patent No.: US 12,771,409 B2
(45) Date of Patent: Oct. 20, 2026

(54) METHODS FOR ANTENNA GROUP SELECTION WITH MULTI-SIDED ANTENNA MODULES

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 340 days.

(21) Appl. No.: 18/453,068

(22) Filed: Aug. 21, 2023

(65) Prior Publication Data

US 2025/0070825 A1 Feb. 27, 2025

(51) Int. Cl.

| | |
|---|---|
| ***H04B 7/0404*** | (2017.01) |
| ***H04B 7/06*** | (2006.01) |
| ***H04B 7/08*** | (2006.01) |
| ***H04W 72/23*** | (2023.01) |

(52) U.S. Cl.

CPC ......... *H04B 7/0404* (2013.01); *H04B 7/0691* (2013.01); *H04B 7/0874* (2013.01); *H04W 72/23* (2023.01)

(58) Field of Classification Search

CPC .. H04B 7/0404; H04B 7/0691; H04B 7/0874; H04W 72/23

See application file for complete search history.

(56) References Cited

U.S. PATENT DOCUMENTS

2018/0077683 A1* 3/2018 Rico Alvarino ...... H04L 5/0023
2018/0278320 A1* 9/2018 Chendamarai Kannan ................. H04B 7/0811
2021/0126761 A1* 4/2021 Venugopal ........ H04W 72/0453
2021/0226681 A1* 7/2021 Raghavan ............ H04B 7/0617

OTHER PUBLICATIONS

International Search Report and Written Opinion—PCT/US2024/039592—ISA/EPO—Jan. 9, 2025 (2305461WO).
Partial International Search Report—PCT/US2024/039592—ISA/EPO—Nov. 15, 2024 (2305461WO).

* cited by examiner

*Primary Examiner* — Ankur Jain
(74) *Attorney, Agent, or Firm* — Harrity & Harrity, LLP

(57) ABSTRACT

Methods, systems, and devices for wireless communications are described. A user equipment (UE) may receive, from a network entity, a first indication of one or more antenna element selection parameters including one or more antenna element performance thresholds for antenna element selection by the UE. The UE may select one or more antenna elements based on the one or more antenna elements satisfying the one or more antenna element performance thresholds. The UE may transmit, to the network entity, a second indication of one or more transmission configuration indicator (TCI) states that correspond to the usage of the one or more antenna elements selected by the UE. The UE and the network entity may communicate in accordance with the one or more TCI states included in the second indication.

28 Claims, 19 Drawing Sheets

METHODS FOR ANTENNA GROUP SELECTION WITH MULTI-SIDED ANTENNA MODULES

FIELD OF TECHNOLOGY

The following relates to wireless communications, including methods for antenna group selection with multi-sided antenna modules.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support methods for antenna group selection with multi-sided antenna modules. For example, the described techniques may enable a wireless communications system to facilitate selection of antenna elements by a user equipment (UE) based on antenna element selection parameters received from a network entity. The described techniques may also enable coordination of active transmission configuration indicator (TCI) states for wireless communications based on the selected antenna elements. In some examples, a UE may receive a first indication of antenna element selection parameters including one or more antenna element performance thresholds. The UE may select one or more antenna elements based on the one or more antenna elements selection parameters. In some examples, the UE may transmit a second indication of one or more TCI states that correspond to the one or more antenna elements selected by the UE. For example, the UE may recommend one or more TCI states based on the one or more antenna elements selected by a UE satisfying one of the one or more antenna element performance thresholds included in the first indication.

A method for wireless communications by a UE is described. The method may include receiving a first indication of one or more antenna element selection parameters, the one or more antenna element selection parameters including one or more antenna element performance thresholds for antenna element selection by the UE and transmitting a second indication of one or more TCI states corresponding to usage of one or more antenna elements of the UE, the one or more antenna elements selected by the UE based on the one or more antenna elements satisfying the one or more antenna element performance thresholds.

A UE for wireless communications is described. The UE may include one or more memories storing processor executable code, and one or more processors coupled with the one or more memories. The one or more processors may individually or collectively operable to execute the code to cause the UE to receive a first indication of one or more antenna element selection parameters, the one or more antenna element selection parameters including one or more antenna element performance thresholds for antenna element selection by the UE and transmit a second indication of one or more TCI states corresponding to usage of one or more antenna elements of the UE, the one or more antenna elements selected by the UE based on the one or more antenna elements satisfying the one or more antenna element performance thresholds.

Another UE for wireless communications is described. The UE may include means for receiving a first indication of one or more antenna element selection parameters, the one or more antenna element selection parameters including one or more antenna element performance thresholds for antenna element selection by the UE and means for transmitting a second indication of one or more TCI states corresponding to usage of one or more antenna elements of the UE, the one or more antenna elements selected by the UE based on the one or more antenna elements satisfying the one or more antenna element performance thresholds.

A non-transitory computer-readable medium storing code for wireless communications is described. The code may include instructions executable by a processor to receive a first indication of one or more antenna element selection parameters, the one or more antenna element selection parameters including one or more antenna element performance thresholds for antenna element selection by the UE and transmit a second indication of one or more TCI states corresponding to usage of one or more antenna elements of the UE, the one or more antenna elements selected by the UE based on the one or more antenna elements satisfying the one or more antenna element performance thresholds.

In some examples of the method, UEs, and non-transitory computer-readable medium described herein, the one or more antenna element performance thresholds may be associated with a feedline loss threshold and the method, apparatuses, and non-transitory computer-readable medium may include further operations, features, means, or instructions for selecting a first set of antenna elements based on the one or more antenna elements satisfying a first antenna element performance threshold associated with the feedline loss threshold and selecting a second set of antenna elements different than the first set of antenna elements based on the one or more antenna elements satisfying a second antenna element performance threshold associated with the blockage loss threshold.

In some examples of the method, UEs, and non-transitory computer-readable medium described herein, the one or more antenna element performance thresholds include first one or more antenna element performance thresholds for uplink communications and second one or more antenna element performance thresholds for downlink communications and the method, apparatuses, and non-transitory computer-readable medium may include further operations, features, means, or instructions for transmitting one or more uplink signals via first one or more antenna elements, the first one or more antenna elements selected by the UE based on the first one or more antenna element performance thresholds and receiving one or more downlink signals via second one or more antenna elements, the second one or more antenna elements selected by the UE based on the second one or more antenna element performance thresholds.

In some examples of the method, UEs, and non-transitory computer-readable medium described herein, the one or more antenna element performance thresholds may be based on a first size of a first antenna array of the UE, a second size of a second antenna array of a network entity, or both.

Some examples of the method, UEs, and non-transitory computer-readable medium described herein may further include operations, features, means, or instructions for selecting the one or more antenna elements from a set of antenna element groups, where each antenna element group of the set of antenna element groups may be associated with a same power characteristic.

In some examples of the method, UEs, and non-transitory computer-readable medium described herein, receiving the first indication may include operations, features, means, or instructions for receiving the first indication via a radio resource control (RRC) message, a downlink control information (DCI) message, a medium access control-control element (MAC-CE) message, or any combination thereof.

In some examples of the method, UEs, and non-transitory computer-readable medium described herein, transmitting the second indication may include operations, features, means, or instructions for transmitting the second indication via an RRC message, an uplink control information (UCI) message, a MAC-CE message, or any combination thereof.

Some examples of the method, UEs, and non-transitory computer-readable medium described herein may further include operations, features, means, or instructions for selecting the one or more antenna elements based on an antenna element configuration at the UE.

In some examples of the method, UEs, and non-transitory computer-readable medium described herein, the antenna element configuration may be associated with a geometry of the one or more antenna elements of the UE, an arrangement of the one or more antenna elements of the UE, one or more boresight directions of the one or more antenna elements of the UE, a radio frequency integrated circuit (RFIC) configuration, a mapping between one or more RFIC ports and one or more feedlines associated with the one or more antenna elements of the UE, or any combination thereof.

In some examples of the method, UEs, and non-transitory computer-readable medium described herein, the one or more antenna elements of the UE includes one or more first sets of antenna elements, each first set of antenna elements associated with a respective set of multiple boresight directions, and one or more second sets of antenna elements, each second set of antenna elements associated with a respective single boresight direction.

Some examples of the method, UEs, and non-transitory computer-readable medium described herein may further include operations, features, means, or instructions for communicating with a network entity in accordance with the one or more TCI states based on transmitting the second indication.

Some examples of the method, UEs, and non-transitory computer-readable medium described herein may further include operations, features, means, or instructions for receiving a third indication from a network entity of one or more second TCI states, different from the one or more TCI states, based on transmitting the second indication and communicating with the network entity in accordance with the one or more second TCI states based on receiving the third indication.

A method for wireless communications by a network entity is described. The method may include transmitting a first indication of one or more antenna element selection parameters, the one or more antenna element selection parameters including one or more antenna element performance thresholds for antenna element selection by a UE and receiving a second indication of one or more TCI states based on transmitting the first indication, the one or more TCI states corresponding to usage of one or more antenna elements of the UE.

A network entity for wireless communications is described. The network entity may include one or more memories storing processor executable code, and one or more processors coupled with the one or more memories. The one or more processors may individually or collectively operable to execute the code to cause the network entity to transmit a first indication of one or more antenna element selection parameters, the one or more antenna element selection parameters including one or more antenna element performance thresholds for antenna element selection by a UE and receive a second indication of one or more TCI states based on transmitting the first indication, the one or more TCI states corresponding to usage of one or more antenna elements of the UE.

Another network entity for wireless communications is described. The network entity may include means for transmitting a first indication of one or more antenna element selection parameters, the one or more antenna element selection parameters including one or more antenna element performance thresholds for antenna element selection by a UE and means for receiving a second indication of one or more TCI states based on transmitting the first indication, the one or more TCI states corresponding to usage of one or more antenna elements of the UE.

A non-transitory computer-readable medium storing code for wireless communications is described. The code may include instructions executable by a processor to transmit a first indication of one or more antenna element selection parameters, the one or more antenna element selection parameters including one or more antenna element performance thresholds for antenna element selection by a UE and receive a second indication of one or more TCI states based on transmitting the first indication, the one or more TCI states corresponding to usage of one or more antenna elements of the UE.

In some examples of the method, network entities, and non-transitory computer-readable medium described herein, transmitting the first indication may include operations, features, means, or instructions for selecting the one or more antenna element performance thresholds based on a performance tradeoff between a blockage loss and a feedline loss, an antenna panel configuration supported by the UE, or both and transmitting the first indication of the one or more antenna element selection parameters based on the selecting.

In some examples of the method, network entities, and non-transitory computer-readable medium described herein, the one or more antenna element performance thresholds may be associated with a feedline loss threshold, a blockage loss threshold, or both.

In some examples of the method, network entities, and non-transitory computer-readable medium described herein, the one or more antenna element performance thresholds include first one or more antenna element performance thresholds for uplink communications and second one or more antenna element performance thresholds for downlink communications and the method, apparatuses, and non-transitory computer-readable medium may include further operations, features, means, or instructions for receiving one or more uplink signals based on the first one or more antenna element performance thresholds and transmitting one or more downlink signals based on the second one or more antenna element performance thresholds.

In some examples of the method, network entities, and non-transitory computer-readable medium described herein, the one or more antenna element performance thresholds may be based on a first size of a first antenna array at the UE, a second size of a second antenna array at the network entity, or both.

In some examples of the method, network entities, and non-transitory computer-readable medium described herein, transmitting the first indication may include operations, features, means, or instructions for transmitting the first indication via an RRC message, a DCI message, a MAC-CE message, or any combination thereof.

In some examples of the method, network entities, and non-transitory computer-readable medium described herein, receiving the second indication may include operations, features, means, or instructions for receiving the second indication via an RRC message, a UCI message, a MAC-CE message, or any combination thereof.

Some examples of the method, network entities, and non-transitory computer-readable medium described herein may further include operations, features, means, or instructions for communicating with one or more UEs including the UE in accordance with the one or more TCI states based on receiving the second indication.

Some examples of the method, network entities, and non-transitory computer-readable medium described herein may further include operations, features, means, or instructions for transmitting a third indication to the UE of one or more second TCI states, different from the one or more TCI states, based on receiving the second indication and communicating with one or more UEs including the UE in accordance with the one or more second TCI states based on transmitting the third indication.

DETAILED DESCRIPTION

Figure 1:
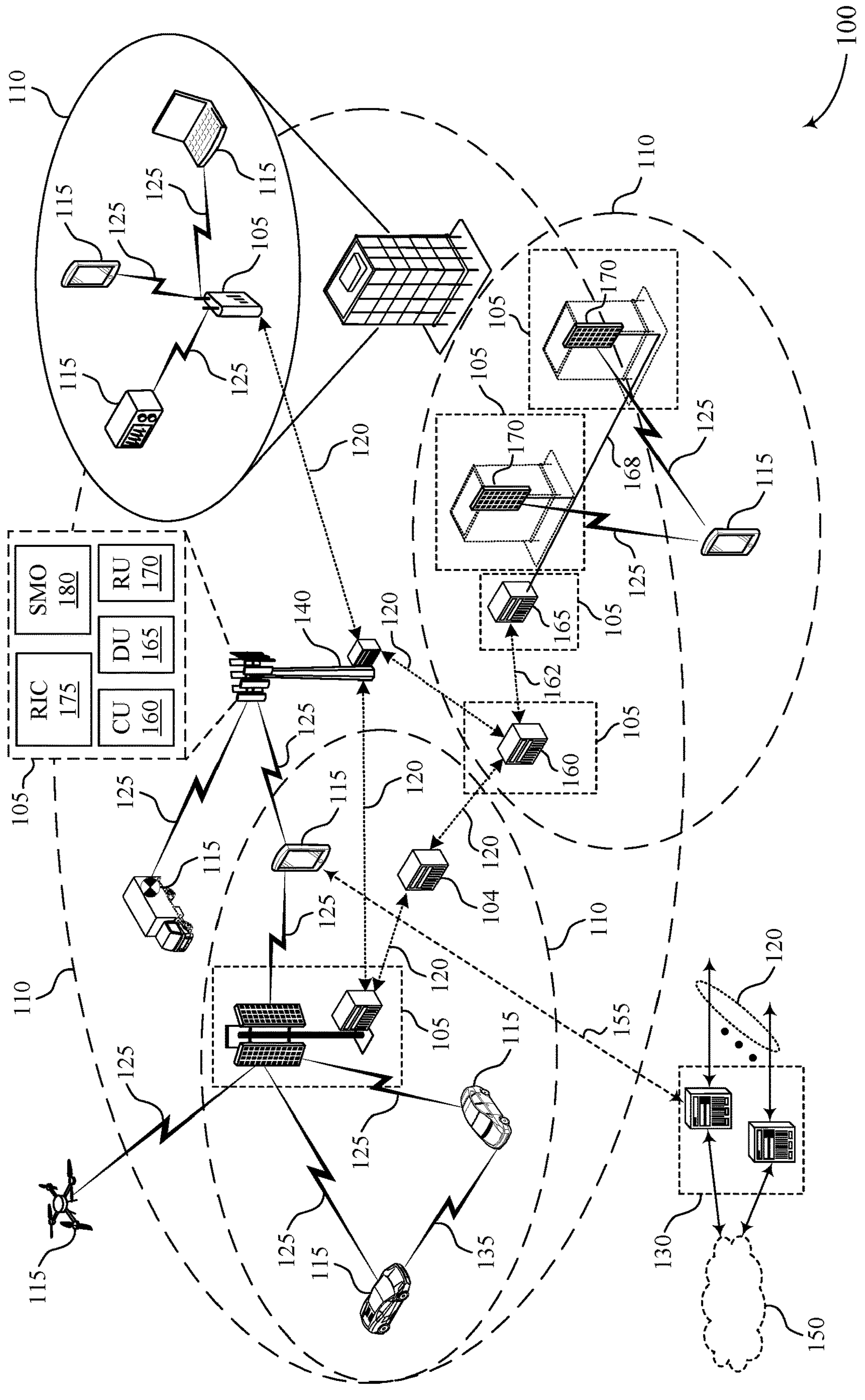
FIGS. 1 and 2 show examples of wireless communications systems that supports methods for antenna group selection with multi-sided antenna modules in accordance with one or more aspects of the present disclosure.

In some wireless communication systems, a user equipment (UE) may be equipped with multiple antenna modules (e.g., each including one or more antenna elements) to perform wireless communications. The multiple antenna modules may provide spatial and directional diversity (e.g., may provide improved spherical coverage) for communication of wireless signals (e.g., at relatively high frequencies). For instance, antenna modules may be located on opposite sides of a UE or implemented such that each antenna panel (e.g., or a boresight direction of each antenna panel) of an antenna module points in a different direction. Based on network conditions, for example, a UE may select between multiple antenna elements across multiple antenna modules to increase (e.g., improve) communication quality (e.g., by avoiding blockages or obstructions, by increasing signal power in a given direction). However, some antenna elements may be associated with higher losses than other antenna elements. For example, the higher losses may be due to length of a feedline for an antenna element (e.g., that may lead to increased feedline losses), a housing of an antenna element, a blockage that obstructs an antenna element, among other factors.

In some cases, a network entity may communicate with a UE using one or more active transmission configuration indicator (TCI) states (e.g., active beam from an active antenna configuration). Different TCI states may be associated with different communication characteristics (e.g., associated with different transmit powers in different spatial directions). Accordingly, the UE may select one or more antenna elements to establish a connection with the network entity according to the one or more active TCI states. However, the network entity may not account for losses (e.g., at a UE) that may be associated with the selection of antenna elements. That is, the network entity may use active TCI states that may not take into consideration the losses at the UE (e.g., for any selection of antenna elements of the UE). For instance, the UE may select antenna elements that are associated with relatively high feedline losses (e.g., losses due to a distance between a power source and an antenna element) or blockage losses (e.g., losses due to an obstruction blocking an antenna element), resulting in decreased communication quality (e.g., via the active TCI states), increased power consumption, reduced coverage, and other adverse effects.

In accordance with aspects described herein, a network entity and a UE may exchange signaling to coordinate a selection of one or more antenna elements (e.g., of the UE) and one or more active TCI states. In some examples, the UE may receive (e.g., a network entity may configure and transmit) a first indication of one or more antenna element selection parameters. The one or more antenna element selection parameters may be associated with one or more antenna element performance thresholds (e.g., a feedline loss threshold, a blockage loss threshold, or other parameters). In some examples, the UE may select a set of antenna elements for communications based on receiving the antenna element selection parameters, among other conditions. For example, the UE may select one or more antenna elements based on the one or more antenna elements satisfying the one or more antenna element performance thresholds, based on a configuration of the one or more antenna elements (e.g., a geometry of antenna elements in an antenna module, an arrangement of antenna elements, boresight direction of antenna elements), other conditions, or any combination thereof.

In some examples, the UE may transmit a second indication of one or more TCI states for communicating with the network entity based on selecting the one or more antenna elements in accordance with the first indication. For example, the UE may select a set of antenna elements based on the first indication and may determine one or more applicable TCI states (e.g., ideal TCI states, preferred TCI states, or recommended TCI states, such as a TCI state that may reduce losses at the UE) corresponding to a usage of the selected set of antenna elements. That is, the UE may select for recommendation (e.g., to a network entity) one or more TCI states that provide increased communication quality (e.g., reduce losses at the UE relative to other TCI states) for the selected set of antenna elements of the UE. In some examples, selecting antenna elements based on one or more antenna element selection parameters, and indicating the one or more TCI states based on the selected antenna elements, may enable a UE and a network entity to increase system efficiency (e.g., network efficiency, efficiency associated with antenna selection) and improve coordination of active TCI states. Such techniques may improve performance of wireless communication systems by increasing spectral efficiency, increasing coordination between devices, increasing signal strength, and decreasing power consumption, among other benefits.

Aspects of the disclosure are initially described in the context of wireless communications systems. Aspects of the disclosure are further illustrated by and described with reference to antenna element configurations, process flows, apparatus diagrams, system diagrams, and flowcharts that relate to methods for antenna group selection with multi-sided antenna modules.

FIG. 1 shows an example of a wireless communications system 100 that supports methods for antenna group selection with multi-sided antenna modules in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support methods for antenna group selection with multi-sided antenna modules as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, a UE 115 may be equipped with multiple antenna modules, where an antenna module may include one or more antenna panels, and an antenna panel may include one or more antenna elements. In some cases, antenna modules may be located on opposite sides of the UE 115 or may include multiple boresight directions to increase coverage (e.g., in frequency range two (FR2) evolution). The UE 115 may select between multiple antenna elements across multiple antenna modules to increase communication quality. However, some antenna elements may be associated with higher losses than other antenna elements. For example, some antenna elements may be associated with higher feedline losses or blockage losses relative to other antenna elements. Additionally, a network entity 105 may communicate with the UE 115 using one or more active TCI states. However, the network entity 105 may not account for losses associated with the selection of antenna elements. In some cases, the network entity 105 may use active TCI states that may not be ideal for the UE 115 due to such losses, which may result in decreased communication quality, increased power consumption, and reduced coverage, among other adverse effects.

In accordance with techniques described herein, a network entity 105 and a UE 115 may exchange signaling to coordinate a selection of one or more antenna elements and coordinate corresponding active TCI states (e.g., one or more active TCI states). In some examples, the UE 115 may receive a first indication of one or more antenna element selection parameters including one or more antenna element performance thresholds. The UE 115 may select a set of antenna elements for communications based on receiving the antenna element selection parameters, and other factors. For example, the UE 115 may select one or more antenna elements based on one or more antenna elements (e.g., selected antenna elements) satisfying the one or more antenna element performance thresholds, based on a configuration (e.g., a geometry, an arrangement, a radio frequency integrated circuit (RFIC) location, boresight directions) of the one or more antenna elements, other factors or a combination thereof. In some examples, the UE 115 may transmit a second indication (e.g., a recommendation) of one or more TCI states for the network entity 105 to configure as active TCI states based on selecting the one or more antenna elements in accordance with the first indication. Such techniques may improve performance of the wireless communication system 100 by increasing spectral efficiency, increasing coordination between devices, increasing signal strength, and decreasing power consumption, among other benefits.

Figure 2:
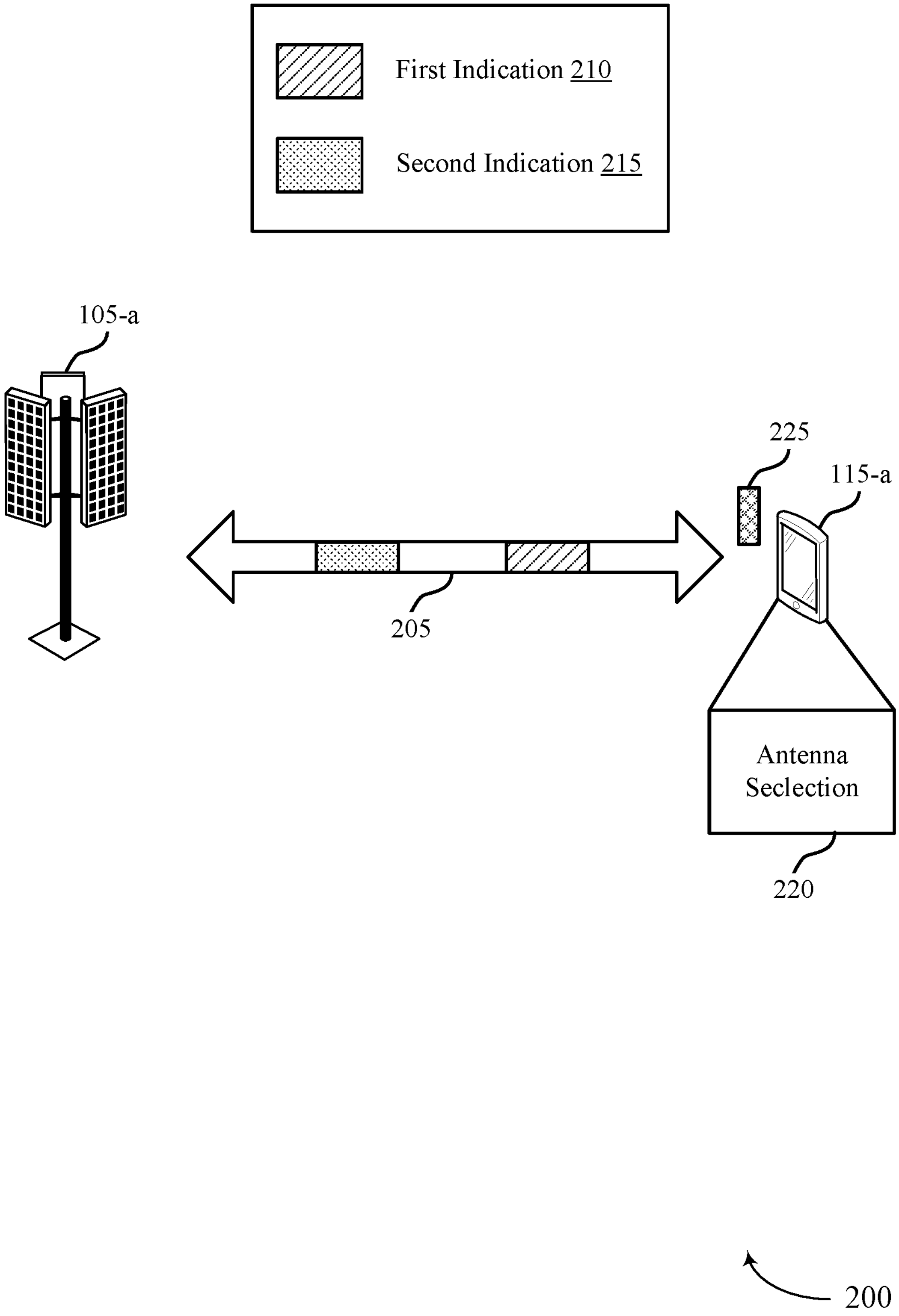

FIG. 2 shows an example of a wireless communications system 200 that supports methods for antenna group selection with multi-sided antenna modules in accordance with one or more aspects of the present disclosure. In some examples, the wireless communications system 200 may implement aspects of the wireless communications system 100 or may be implemented by aspects of the wireless communications system 100. For example, the wireless communications system 200 may include a network entity 105-*a* and a UE 115-*a*, which may represent examples of a network entity 105 and a UE 115 as described with reference to FIG. 1. The network entity 105-*a* and the UE 115-*a* may communicate via a communication link 205. The wireless communications system 200 may utilize a first indication 210, a second indication 215, antenna selection 220, or a combination thereof to improve antenna selection procedures (e.g., at the UE 115-*a*) and improve coordination of active TCI states used for communications between the network entity 105-*a* and the UE 115-*a*.

In some cases, a network entity 105-*a* and a UE 115-*a* may use multiple antenna elements connected to independent antenna modules (e.g., antenna panels, antenna arrays, or the like) to communicate (e.g., in a mmW system). For instance, a UE 115-*a* may include multiple antenna modules, where each antenna module may include one or more antenna panels. In some cases, each antenna panel may include one or more antenna elements that may support beamforming techniques to compensate for power losses (e.g., may bridge a link budget in mmW systems). For instance, one or more antenna elements may be selected across one or more antenna modules to enable a device to direct power for wireless communication signals in a given spatial direction. That is, each antenna module may include a set of antenna elements that may be co-phased for beamforming of wireless communications signals. In some cases, a device (e.g., a UE 115-*a*, a network entity 105-*a*) may include multiple antenna modules to increase spatial coverage (e.g., spherical, directional, or regional coverage). The multiple antenna modules may enable the device to satisfy a spatial coverage expectation (e.g., may afford an ability of a device to meet a spherical coverage expectation), both when a blockage (e.g., a hand or body blockage) is present and when a blockage is not present. The multiple antenna modules may also provide robustness (e.g., provide various configuration for selection of antenna elements) associated with beam switching between (e.g., over) the antenna modules. For instance, meeting some spherical coverage expectations using a single boresight direction may increase complexity at a device or system.

In some cases, a UE 115-*a* may be expected to support spherical coverage (e.g., to provide acceptable coverage quality in at least a significant majority of directions around the UE 115-*a*) to enable communication of wireless signals at relatively high frequencies (e.g., mmW frequencies). Accordingly, the UE 115-*a* may include multiple antenna modules, where some antenna modules may include a single boresight direction (e.g., a linear antenna array, a planar antenna array) and other antenna modules may include multiple boresight directions (e.g., a two-sided antenna array, a three-sided antenna array). As used herein, a boresight direction may refer to a direction that is normal (e.g., perpendicular) to a surface of a set of antennas (e.g., an antenna panel, an antenna array, an antenna element).

In some cases, antenna elements of the multiple antenna modules may be available for selection (e.g., dynamic selection) by the UE 115-*a*. That is, the UE 115-*a* may select (e.g., choose) any combination of antenna elements across the multiple antenna modules for signaling between the UE 115-*a* and the network entity 105-*a*. For instance, the UE 115-*a* may select a first set of antenna elements on opposite sides (e.g., edges) of the UE 115-*a* or a second set of antenna elements on a same side of the UE 115-*a* but pointed in different directions. In such cases, the unselected antenna modules (e.g., or antenna elements) may remain inactive and power consumption associated with the different sets of selected antenna elements may be comparable (e.g., the power consumption may be comparable between the first set of antenna elements and the second set of antenna elements).

However, some antenna elements may be associated with higher losses than other antenna elements. For instance, a first antenna element may be located at a farther distance away from a power source (e.g., a bump in an RFIC) than a second antenna element (e.g., of a same antenna module). As such, the first antenna element may be coupled with the power source via a first feedline (e.g., a conductive path, a transmission line) that is longer than a second feedline associated with the second antenna element. Thus, the first antenna element (e.g., the first feedline) may incur a higher feedline loss than the second antenna element (e.g., the second feedline). In some cases, feedline losses may further increase when operating at relatively high frequencies (e.g., mmW frequencies). Additionally, a first antenna element may be blocked by a blockage 225 (e.g., a hand or other obstructions), while a second antenna element may not be blocked by the blockage 225. Thus, the first antenna element may incur a higher blockage loss than the second antenna element.

In some cases, the network entity 105-*a* may use one or more TCI states (e.g., active TCI states) to communicate with the UE 115-*a*. Different TCI states may be associated with different communication characteristics, such as different spatial beams for a communication channel. To improve communications, the UE 115-*a* may select one or more antenna elements that correspond to one or more active TCI states (e.g., one or more TCI states being used by the network entity 105-*a*). However, the network entity 105-*a* may not account for losses at the UE 115-*a*, such as feedline losses or blockage losses when determining one or more active TCI states for communications with the UE 115-*a*. Accordingly, to communicate via the one or more active TCI states, the UE 115-*a* may select one or more antenna elements associated with relatively high losses (e.g., or the UE 115-*a* may not support a selection of antenna elements that mitigates such losses). That is, the one or more active TCI states may result in losses (e.g., feedline losses, blockage losses) at the UE 115-*a*, and current mechanisms may not enable a network entity 105-*a* or a UE 115-*a* to compensate for (e.g., account for) such losses.

In accordance with techniques of the present disclosure, the network entity 105-*a* and the UE 115-*a* may exchange signaling to improve coordination of antenna selection (e.g., antenna selection 220 by the UE) and one or more TCI state configurations in the wireless communications system 200. In some examples, the UE 115-*a* may have (e.g., may be equipped with) multiple antenna modules including a first quantity of antenna modules that each include multiple boresight directions (e.g., each antenna panel of the antenna module may have different boresight directions), and a second quantity of antennas modules that each include a single boresight direction. The UE 115-*a* may perform antenna selection 220 to select (e.g., dynamically) one or more antenna elements (e.g., a select a set of arrays) from one or more sets of antenna element groups for communicating (e.g., transmission and reception) with the network entity 105-*a*. In some examples, each antenna element group may be associated with a same power characteristic (e.g., similar power consumption). In other words, the UE 115-*a* may select the one or more antenna elements from different antenna element array possibilities with a comparable power consumption profile.

In some examples, to improve the antenna selection 220, the UE 115-*a* may receive a first indication 210 from the network entity 105-*a*. The first indication 210 may include one or more antenna element selection parameters, such as one or more antenna element performance thresholds. The one or more antenna element performance thresholds may include a feedline loss threshold, a blockage loss threshold, a housing loss threshold, or any combination thereof. In some examples, the network entity 105-*a* may select (e.g., determine, configure) the one or more antenna element performance thresholds based on a performance tradeoff between a blockage loss and a feedline loss, an antenna panel configuration supported by the UE 115-*a* (e.g., a distance between antenna modules or antenna elements), a size of an antenna array at the UE 115-*a*, a size of an antenna array at the network entity 105-*a*, or any combination thereof. In some examples, the first indication may be communicated via an RRC message, a downlink control information (DCI) message, a MAC-control element (MAC-CE), or a combination thereof.

The one or more antenna element selection parameters indicated via the first indication 210 may be specific to a type of communication link (e.g., uplink gains may be more significant than downlink gains). That is, the network entity 105-*a* may configure different antenna element performance thresholds for different types of communications (e.g., uplink communications, downlink communications, sidelink communications, among other examples). For example, a first set of antenna element selection parameters may apply for uplink communications and a second set of antenna element selection parameters may apply for downlink communications. Accordingly, the UE 115-*a* may transmit an uplink signal via one or more first antenna elements that are selected based on the first set of antenna element selection parameters, and may receive a downlink signal via one or more second antenna elements that are selected based on the second set of antenna element selection parameters.

In some examples, the UE 115-*a* may perform antenna selection 220 in accordance with the first indication 210. That is, the antenna selection 220 may be network assisted (e.g., as opposed to a UE-only implementation or antenna selection in frequency range one (FR1)). For example, the UE may select one or more antenna elements based on the one or more antenna elements satisfying an antenna element performance threshold. Accordingly, the antenna selection 220 may lead to changes associated with one or more active TCI states (e.g., may have network impact in terms of activating different TCI states). Thus, based on the antenna selection 220 (e.g., the selected antenna group at the UE 115-*a*), the UE 115-*a* may transmit a second indication 215 to the network entity 105-*a*. The second indication 215 may include one or more TCI states (e.g., recommended active TCI states) that correspond to (e.g., may be applicable for) the selection (e.g., usage) of the one or more antenna elements (e.g., the selected antenna element group). That is, the second indication 215 may include one or more TCI states that are recommended for completing a communication link (e.g., between the UE 115-*a* and the network entity 105-*a*) based on the one or more selected antenna elements. In some examples, the second indication 215 may be communicated via an RRC message, an uplink control information (UCI) message, a MAC-CE message, or a combination thereof.

Accordingly, the network entity 105-*a* may receive the second indication 215 and determine to communicate with the UE 115-*a* using the one or more TCI states that are included in the second indication 215 (e.g., recommended by the UE 115-*a*). Thus, the network entity 105-*a* and the UE 115-*a* may increase efficiency of the wireless communications system 200 by using one or more TCI states that are associated with improved performance at the UE 115-*a* (e.g., based on a relatively lower loss, based on a desired performance tradeoff). Alternatively, the network entity 105-*a* may determine to communicate with the UE 115-*a* using one or more second TCI states (e.g., different from the one or more TCI states included in the second indication 215). For example, the network entity 105-*a* may determine that the one or more TCI states of the second indication 215 may not be suitable for communications with one or more other connected UEs (not shown) and may accordingly select the one or more second TCI states. In some examples, the network entity 105-*a* may transmit a third indication (not shown) of the one or more second TCI states to the UE 115-*a*, and the UE 115-*a* and the network entity 105-*a* may communicate in accordance with the one or more second TCI states. The third indication may be communicated via an RRC message, a DCI message, a MAC-CE message, or any combination thereof.

In some examples, performance of antenna selection 220 based on the first indication 210, as described herein may provide increased efficiency of communications (e.g., beamforming communications) to the wireless communications system 200. For example, based on receiving the first indication 210, the UE 115-*a* may perform antenna selection 220 to compensate for feedline losses of antenna elements, blockage losses, or other losses. Additionally, the antenna selection 220 may affect the applicable TCI states. Thus, communicating the second indication 215, as described herein, may enable a network entity 105-*a* to adjust the active TCI states in accordance with the antenna selection 220. As a result, the wireless communications system 200 may operate with increased spectral efficiency, increased coverage, and increased reliability, among other benefits.

Figure 3:
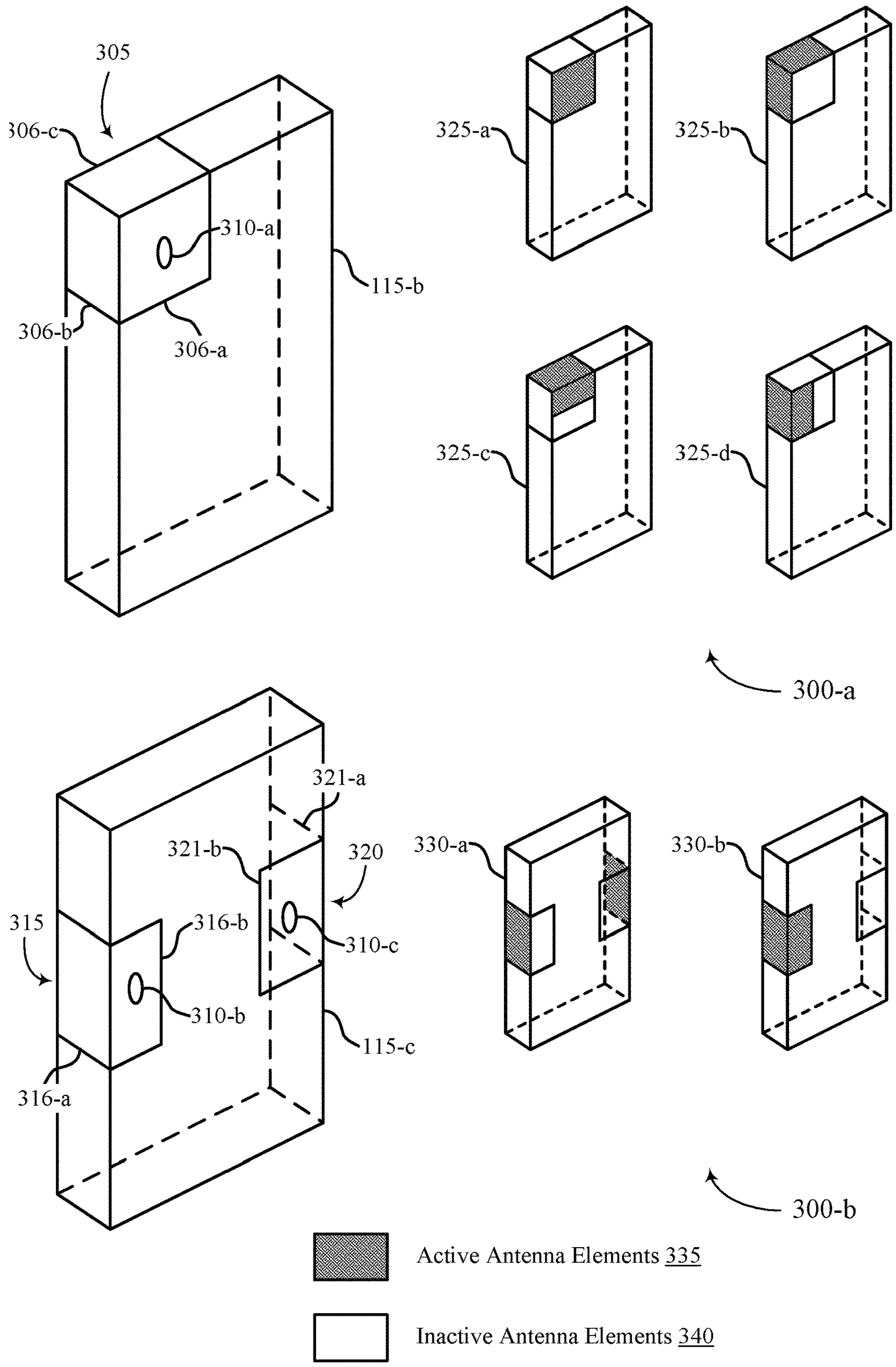
FIG. 3 shows examples of antenna element configurations that support methods for antenna group selection with multi-sided antenna modules in accordance with one or more aspects of the present disclosure.

FIG. 3 shows examples of an antenna element configuration 300-*a* and an antenna element configuration 300-*b* that support methods for antenna group selection with multi-sided antenna modules in accordance with one or more aspects of the present disclosure. In some examples, the antenna element configuration 300-*a* and the antenna element configuration 300-*b* may implement aspects of or be implemented by the wireless communications system 100 or the wireless communications system 200. For example, a UE 115-*b* and a UE 115-*c* may be examples of, or include a UE 115 or a UE 115-*a* as described with reference to FIGS. 1 and 2. As another example, a UE 115-*a*, as described with reference to FIG. 2, may support the antenna element configuration 300-*a*, the antenna element configuration 300-*b*, or both.

The antenna element configuration 300-*a* and the antenna element configuration 300-*b* are shown as non-limiting examples. That is, it is to be understood that a UE 115 may support other antenna element configurations and may apply the techniques described herein to any antenna element configuration (e.g., including antenna modules with different geometries or different arrangements than the examples shown in FIG. 3). For instance, a UE 115 may use a combination of antenna elements from the antenna element configuration 300-*a* and antenna elements from the antenna element configuration 300-*b*, or other antenna element configurations. In some examples, antenna module configurations (e.g., such as the antenna element configuration 300-*a* and the antenna element configuration 300-*b*) may include an multiple boresight directions to improve a spherical coverage of a UE 115. For example, the multiple boresight directions may increase spatial diversity of communications for a UE 115 by providing coverage in multiple different directions.

In the antenna element configuration 300-*a*, the UE 115-*b* may include an antenna module 305 with multiple antenna panels (e.g., or antenna arrays) including a first antenna panel 306-*a*, a second antenna panel 306-*b*, and a third antenna panel 306-*c*. In some examples, the antenna module 305 may be referred to as a "double L" shaped antenna module (e.g., including three boresight directions). The antenna module 305 may also include a power source 310-*a* (e.g., a bump, an RFIC), which may provide power to each of the antenna panels 306. In some examples, the first antenna panel 306-*a* and the second antenna panel 306-*b* may scan a first plane (e.g., an XY plane in an XYZ coordinate system), the first antenna panel 306-*a* may have a first boresight direction (e.g., in a positive or negative X direction), and the second antenna panel 306-*b* may have a second boresight direction (e.g., in a positive or negative Y direction). In some examples, the third antenna panel 306-*c* may scan a second plane (e.g., an XZ plane in an XYZ coordinate system) and a third plane (e.g., a YZ plane in an XYZ coordinate system), and may have a third boresight direction (e.g., in a positive or negative Z direction).

In some examples, each antenna panel 306 may include one or more antenna elements. The UE 115-*b* may select a combination of one or more active antenna elements 335 across each of the antenna panels 306, while the unselected antenna elements may remain as one or more inactive antenna elements 340. Accordingly, various antenna selection configurations 325 may be possible for the UE 115-*b*, such as a first antenna selection configuration 325-*a*, a second antenna selection configuration 325-*b*, a third antenna selection configuration 325-*c*, and a fourth antenna selection configuration 325-*d*. Although example antenna selection configurations 325 are shown, other antenna selection configurations, or combinations of antenna selection configurations 325 are possible and explicitly contemplated herein. In some examples, each antenna selection configuration 325 may be associated with a same (e.g., or similar) power consumption profile.

In the antenna element configuration 300-*b*, the UE 115-*c* may include a first antenna module 315 and a second antenna module 320, each with multiple antenna panels. In some examples, the first antenna module 315 and the second antenna module 320 may be referred to as a "L" shaped antenna modules (e.g., including two boresight directions). The first antenna module 315 may include a first antenna panel 316-*a* and a second antenna panel 316-*b*, and the second antenna module 320 may include a first antenna panel 321-*a* and a second antenna panel 321-*b*. The first antenna module 315 may include a power source 310-*b* that provides power to the antenna panels 316, and the second antenna module 320 may include a power source 310-*c* that provides power to each of the antenna panels 321. In some examples, the first antenna module 315 and the second antenna module 320 may provide the UE 115-*c* with multiple (e.g., three) boresight directions. For example, the first antenna panel 316-*a* may have a first boresight direction, the second antenna panel 316-*b* and the second antenna panel 321-*b* may have a second boresight direction, and the first antenna panel 321-*a* may have a third boresight direction (e.g., opposite to the first boresight direction).

In some examples, each antenna panel 316 and each antenna panel 321 may include one or more antenna elements. The UE 115-*c* may select a combination of one or more active antenna elements 335 across the antenna panels 316 and the antenna panels 321, while the unselected antenna elements may remain as one or more inactive antenna elements 340. Accordingly, various antenna selection configurations 330 may be possible for the UE 115-*c*, such as a first antenna selection configuration 330-*a*, and a second antenna selection configuration 330-*b*. Although example antenna selection configurations 330 are shown, other antenna selection configurations, or combinations of antenna selection configurations 330 are possible and explicitly contemplated herein. In some examples, each antenna selection configuration 330 may be associated with a same (e.g., or similar) power consumption profile.

In some cases, some antenna panels (e.g., antenna panels 306, antenna panels 316, antenna panels 321) may be associated with higher losses than other antenna panels. For example, each antenna panel may be coupled with a power source 310 via a feedline (e.g., a conductive path). In some cases, there may be losses associated with a length of the feedline. Accordingly, antenna panels that are associated with relatively longer feedlines may incur higher feedline losses than antenna panels associated with relatively shorter feedlines. For example, the power source 310-*b* may be located on a back face of the UE 115-*c*. Thus, feedline loss may increase (e.g., at mmW frequencies) for antenna panels located relatively far away from the power source 310-*b* (e.g., antenna arrays on the edge placement). That is, the first antenna panel 316-*a* may be associated with a higher feedline loss than the second antenna panel 316-*b* (e.g., due to the power source 310-*b* being located on or near the second antenna panel 316-*b*). In some examples, losses due to the housing of an antenna panel (e.g., housing losses) may also be higher than other antenna panels (e.g., one side of an antenna module may be more affected by housing losses relative to the other side of the antenna module).

In some cases, some antenna panels (e.g., antenna panels 306, antenna panels 316, antenna panels 321) may be subject to higher losses related to blockages than other antenna panels. For instance, a blockage may impede a first antenna panel while a second antenna panel may remain at least partially unblocked. Thus, the first antenna panel may be associated with a higher blockage loss than the second antenna panel. In some examples, uplink gains may be more significant than downlink gains. Additionally, a first gain of an antenna module with multiple boresight directions (e.g., the first antenna module 315, an "L" shaped array structure) versus a second gain of an antenna module with a single boresight direction (e.g., a linear array) may be based on a feedline loss or hosing loss (e.g., assumed feedline loss or housing loss), a type of blockage, a percentile point of interest, or the like.

In accordance with techniques described herein, a selection of antenna elements (e.g., a selection choice) may be based on multiple factors such as feedline losses (e.g., associated with different antenna arrays), uplink communications, downlink communications, and blockage losses (e.g., a type of blockage observed), among other factors. In some examples, a UE 115 may select (e.g., dynamically) one or more antenna elements based on the one or more antenna elements satisfying one or more antenna element performance thresholds (e.g., parameters configured from the network entity side). In other words, a UE 115 may dynamically select different antenna groups from within a set of available antenna modules based on parameters configured by a network entity (e.g., gNB). In some examples, the one or more antenna element performance thresholds may be associated with a feedline loss threshold, a blockage loss threshold, a housing loss threshold, a tradeoff between the feedline loss and the blockage loss, or any combination thereof. In some examples, a UE 115 may determine that one or more antenna elements satisfy the feedline loss threshold and accordingly select a first set of antenna elements (e.g., a likely-to-be-blocked yet geographically separate group of antennas even if a blockage loss may exceed a threshold). Alternatively, the UE 115 may determine that one or more antenna elements satisfy the blockage loss threshold and accordingly select a second set of antenna elements different than the first set (e.g., geographically co-located group even if a feedline losses may be significant).

In some examples, a UE 115 may select one or more antenna elements based on an antenna element configuration at the UE 115. The selection of one or more antenna elements may be a function a geometry of the one or more antenna elements of the UE 115 (e.g., antenna module geometry, a shape of the antenna modules), an arrangement of the one or more antenna elements of the UE (e.g., physical placement of antenna elements such as on edges, faces, or the like), one or more boresight directions of the one or more antenna elements of the UE, an RFIC configuration (e.g., RFIC design), a mapping between one or more RFIC ports and one or more feedlines associated with the one or more antenna elements of the UE, or any combination thereof. In other words, antenna selection may be based on a capability of a UE 115, based on RFIC constraints, or both.

In some examples, configured thresholds (e.g., antenna element performance thresholds) may be different for uplink communications and downlink communications. That is, a network entity may configure and transmit multiple sets of antenna element performance thresholds (e.g., two sets for uplink and downlink respectively) to a UE 115. The UE 115 may accordingly select different sets of one or more antenna elements based on whether a communication is associated with uplink or downlink. In some examples, the selection of one or more antenna elements may also be based on antenna array sizes (e.g., at a network entity, at a UE 115, or both). In some examples, selection (e.g., dynamic selection) may be across groups of antenna elements that consume a similar amount of power.

Figure 4:
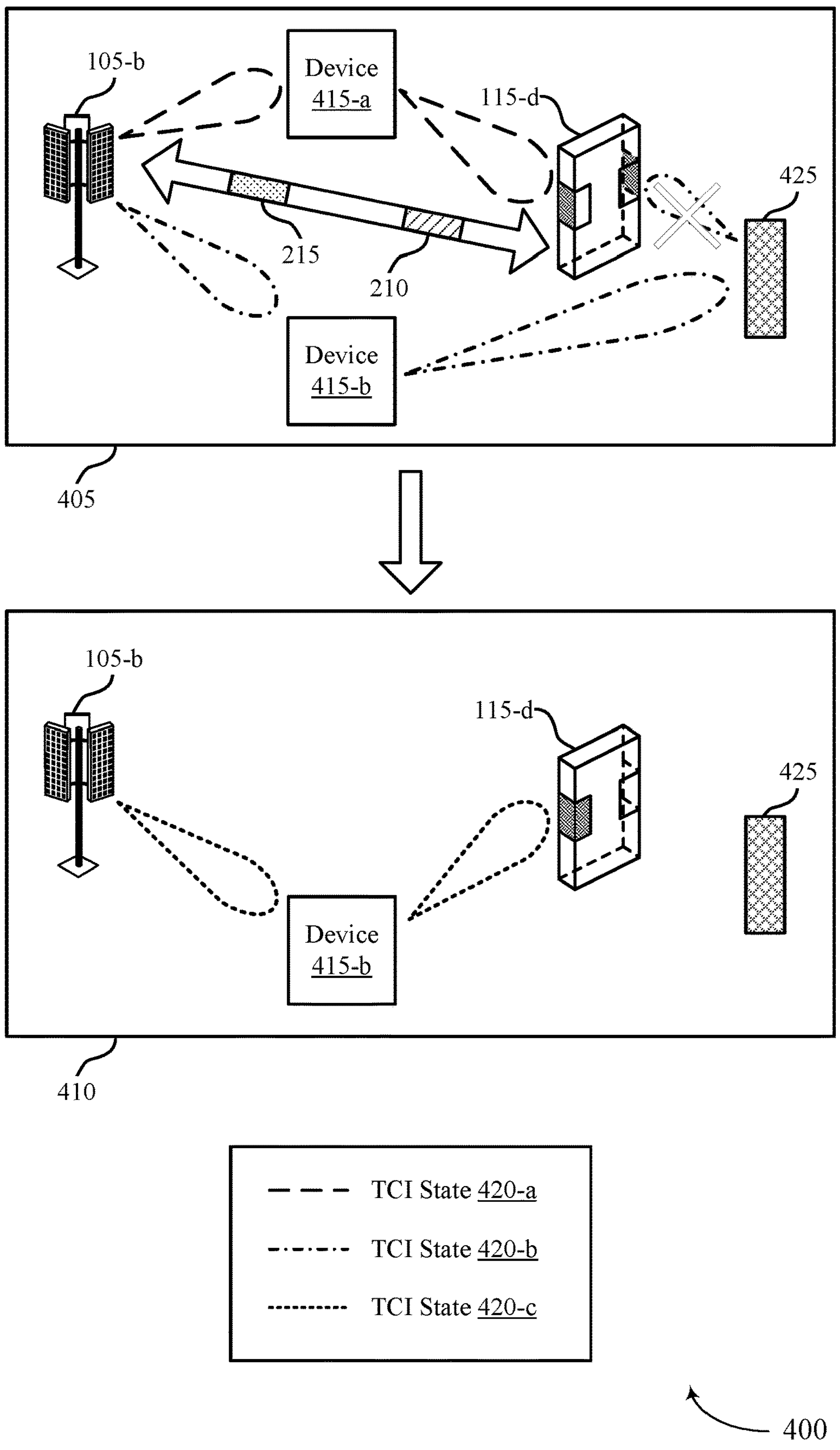
FIG. 4 shows an example of a wireless communications system that supports methods for antenna group selection with multi-sided antenna modules in accordance with one or more aspects of the present disclosure.

FIG. 4 shows an example of a wireless communications system 400 that supports methods for antenna group selection with multi-sided antenna modules in accordance with one or more aspects of the present disclosure. In some examples, the wireless communications system 400 may implement, or be implemented by, aspects of the wireless communications system 100, the wireless communications system 200, and the antenna element configurations 300. For example, the wireless communications system 400 may include a network entity 105-*b* and a UE 115-*d*, which may respectively represent examples of a network entity 105, network entity 105-*a*, a UE 115, a UE 115-*a*, a UE 115-*b*, and a UE 115-*c* as described with reference to FIGS. 1 through 3. For instance, the UE 115-*d* may implement the antenna element configuration 300-*b*. The wireless communications system 400 may also include devices 415 (e.g., relay devices, V2X devices, network nodes, other UEs, or other devices).

In a first configuration 405, the network entity 105-*b* and the UE 115-*d* may initially communicate via one or more first active TCI states (e.g., a first set of active TCI states). For instance, the active TCI states may include a first TCI state 420-*a* and a second TCI state 420-*b*, which may include communications (e.g., between the network entity 105-*b* and the UE 115-*d*) via a first device 415-*a* and a second device 415-*b*. Although FIG. 4 includes the first device 415-*a* and the second device 415-*b*, the UE 115-*d* and the network entity 105-*b* may communicate without involvement of any other devices (e.g., the first device 415-*a* and the second device 415-*b* may not be present).

In some examples, the UE 115-*d* may receive a first indication 210 from the network entity 105-*b* (e.g., as described with reference to FIG. 2). That is, the network entity 105-*b* may configure one or more antenna element performance thresholds for antenna element selection by the UE 115-*d*. In some examples, receiving the first indication 210 may result in changes to the one or more first active TCI states. For instance, the one or more antenna element performance thresholds may include a feedline loss threshold and a blockage loss threshold. The UE 115-*d* may determine that a first selection of active antenna elements at the UE 115-*d* (e.g., shown in the first configuration 405) satisfy (e.g., exceed) a blockage threshold due to a blockage 425 (e.g., the blockage 425 may degrade the communication quality of the second TCI state 420-*b*). The UE 115-*d* may accordingly select a second set of one or more antenna elements for communications (e.g., shown in a second configuration 410), which may not be ideal for communications via the first TCI state 420-*a* and the second TCI state 420-*b*. For instance, the UE 115-*d* may determine that a third TCI state 420-*c* may provide improved communication quality over other TCI states (e.g., over the first TCI state 420-*a* and the second TCI state 420-*b*).

In some examples, the UE 115-*d* may transmit a second indication 215 to the network entity 105-*b* (e.g., as described with reference to FIG. 2). That is, the UE 115-*d* may recommend a change in the first one or more active TCI states. The second indication 215 may include a recommendation for the network entity 105-*b* to switch from the one or more first active TCI states to one or more second active TCI states (e.g., a second set of active TCI states). For example, the second indication 215 may recommend that the network entity 105-*b* switch from the first TCI state 420-*a* and the second TCI state 420-*b* (e.g., a multiple TCI state and a multiple TRP solution) to the third TCI state 420-*c* (e.g., a single TCI state and a single TRP solution). The network entity 105-*b* may receive the second indication 215 and determine to use the third TCI state 420-*c* (e.g., instead of the first TCI state 420-*a* and the second TCI state 420-*b*) as an active TCI state, and the wireless communications system 400 may switch to a second configuration 410. Alternatively, the network entity 105-*b* may choose one or more third active TCI states (e.g., a third set of active TCI states, a set of TCI states different from the recommended TCI states) for communications, and may transmit a third indication (not shown) of the one or more third active TCI states.

Communicating in accordance with the second configuration 410 (e.g., based on the first indication 210 and the second indication 215) may enable the UE 115-*d* and the network entity 105-*b* to improve communication efficiency (e.g., by avoiding the blockage 425, by increasing signal power in a given direction). For instance, by applying techniques herein, the wireless communications system 400 may experience improved data rates, improved throughput, increased spectral efficiency of wireless communications, decreased losses in communication signals, improved device coordination, and reduced power or energy consumption for a same achievable rate, among other benefits.

Figure 5:
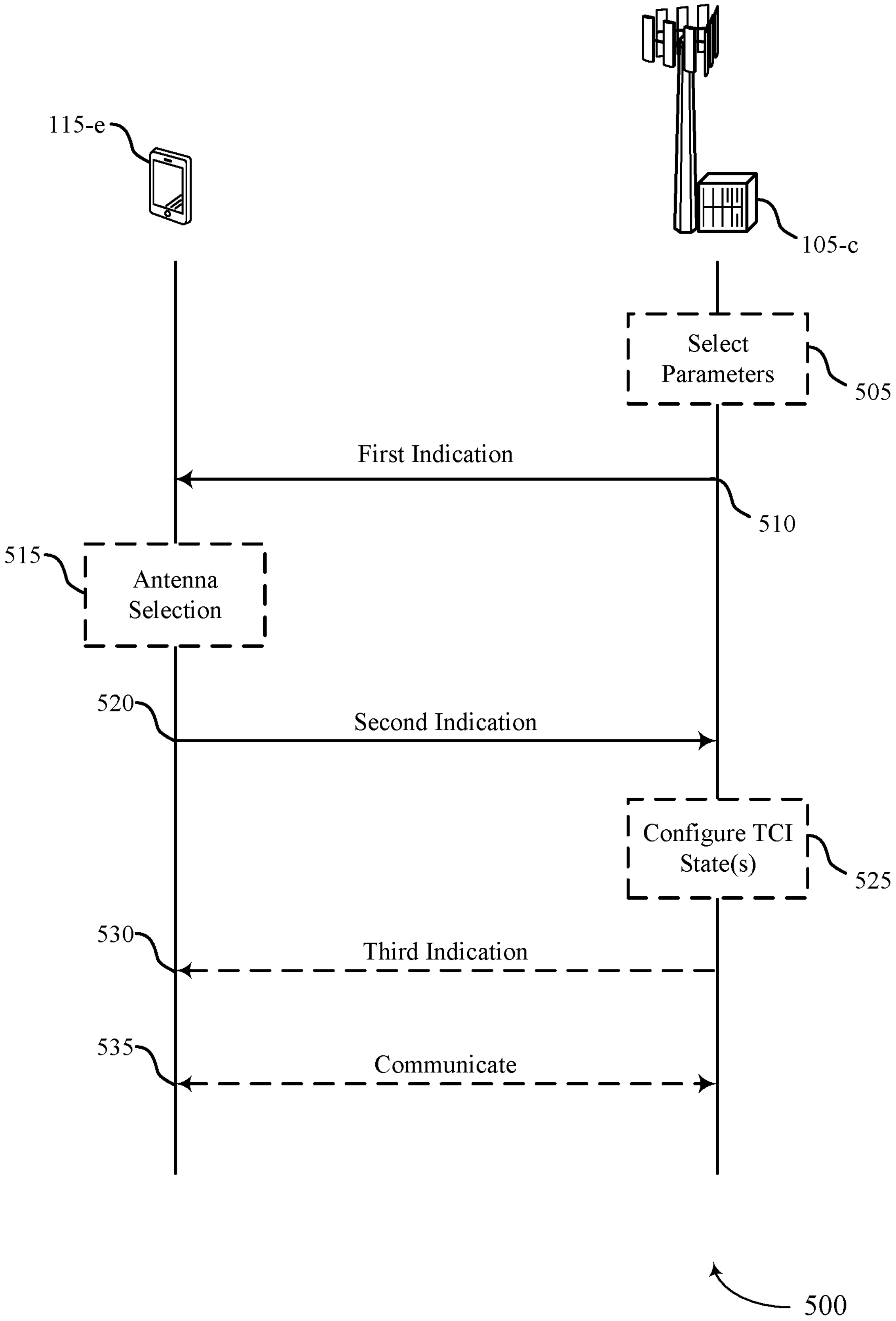
FIG. 5 shows an example of a process flow that supports methods for antenna group selection with multi-sided antenna modules in accordance with one or more aspects of the present disclosure.

FIG. 5 shows an example of a process flow 500 that supports methods for antenna group selection with multi-sided antenna modules in accordance with one or more aspects of the present disclosure. In some examples, the process flow 500 may implement aspects of the wireless communications system 100, the wireless communications system 200, the antenna element configuration 300-*a* and 300-*b*, and the wireless communications system 400. For example, the process flow 500 may include a UE 115-*e*, which may be an example of a UE illustrated by and described with reference to FIGS. 1 through 4. The process flow 500 may also include a network entity 105-*c*, which may be an example of a network entity illustrated by and described with reference to FIGS. 1, 2, and 4.

In the following description of the process flow 500, the operations performed by the network entity 105-*c* and the UE 115-*e* may be performed in different orders or at different times than the example order shown. Some operations may also be omitted from the process flow 500, or other operations may be added to the process flow 500. Although some operations or signaling may be shown to occur at different times for discussion purposes, these operations may actually occur at the same time. Further, while operations in the process flow 500 are illustrated as being performed by the network entity 105-*c* and the UE 115-*e*, the examples herein are not to be construed as limiting, as the described features may be associated with any quantity of different devices. For example, some aspects of some operations of the process flow 500 may be performed by one or more other wireless or network devices.

At 505, the network entity 105-*c* may select one or more antenna element performance thresholds based on a performance tradeoff between a blockage loss and a feedline loss, an antenna panel configuration supported by the UE 115-*e*, or both. For example, the network entity 105-*c* may select a feedline loss threshold, a blockage loss threshold, a housing loss threshold, or some other threshold based on the performance tradeoff and the antenna panel configuration at the UE 115-*e*.

At 510, The UE 115-*e* may receive, from a 105-*c*, a first indication of one or more antenna element selection parameters, the one or more antenna element selection parameters may include one or more antenna element performance thresholds for antenna element selection by the UE 115-*e*. In some examples, the one or more antenna element performance thresholds may be associated with a feedline loss threshold, a blockage loss threshold, or both. In some examples, the one or more antenna element performance thresholds may include first one or more antenna element performance thresholds for uplink communications and second one or more antenna element performance thresholds for downlink communications. In some examples, the one or more antenna element performance thresholds may be based on a first size of a first antenna array of the UE 115-*e*, a second size of a second antenna array of a network entity 105-*c*, or both. In some examples, the first indication may be communicated (e.g., received, transmitted) via an RRC message, a DCI message, a MAC-CE message, some other message, or any combination thereof.

At 515, the UE 115-*e* may select a first set of antenna elements based on the one or more antenna elements satisfying a first antenna element performance threshold associated with the feedline loss threshold. That is, a selection of antenna elements may satisfy (e.g., exceed) the feedline loss threshold, and the UE 115-*e* may accordingly select the first set of antenna elements to mitigate the feedline loss. Additionally, or alternatively, the UE 115-*e* may select a second set of antenna elements, different than the first set of antenna elements, based on the one or more antenna elements satisfying a second antenna element performance threshold associated with the blockage loss threshold. That is, a selection of antenna elements may satisfy a blockage loss threshold, and the UE 115-*e* may accordingly select the second set of antenna elements to mitigate the blockage loss (e.g., avoid the blockage). Additionally, or alternatively, the UE 115-*e* may select the one or more antenna elements from a set of antenna element groups, where each antenna element group of the set of antenna element groups may be associated with a same power characteristic.

In some examples, the UE 115-*e* may select the one or more antenna elements based on an antenna element configuration at the UE 115-*e*. For example, the antenna element configuration may be associated with a geometry (e.g., an "L" shape, a "double L" shape) of the one or more antenna elements of the UE 115-*e*, an arrangement of the one or more antenna elements of the UE 115-*e*, one or more boresight directions of the one or more antenna elements of the UE 115-*e*, an RFIC configuration (e.g., a location of an RFIC at the UE 115-*e*), a mapping between one or more RFIC ports and one or more feedlines associated with the one or more antenna elements of the UE 115-*e*, or any combination thereof. In some examples, the one or more antenna elements of the UE 115-*e* may include one or more first sets of antenna elements, each first set of antenna elements associated with a respective plurality of boresight directions, and one or more second sets of antenna elements, each second set of antenna elements associated with a respective single boresight direction. That is, a UE 115-*e* may be equipped with multiple antenna modules, where each antenna module may include multiple boresight directions or a single boresight direction, and the UE 115-*e* may select any combination of antenna elements across the multiple antenna modules (e.g., based on the first indication).

At 520, the UE 115-*e* may transmit, to the network entity 105-*c*, a second indication of one or more TCI states corresponding to usage of one or more antenna elements of the UE 115-*e*. In some examples, the one or more antenna elements selected by the UE 115-*e* may be based on the one or more antenna elements satisfying the one or more antenna element performance thresholds (e.g., included in the first indication). That is, the UE 115-*e* may recommend one or more TCI states to be used as active TCI states for communication based on one or more selected antenna elements. In some examples, the UE 115-*e* may transmit the second indication via an RRC message, a UCI message, a MAC-CE message, some other message, or any combination thereof.

At 525, the network entity 105-*c* may configure one or more TCI states to be used as active TCI states. For example, the network entity 105-*c* may determine whether to communicate using the one or more TCI states included in the second indication (e.g., from the UE 115-*e*) or one or more different TCI states. For instance, the network entity 105-*c* may determine that one or more first TCI states included in the second indication may not be suitable for communications with other devices.

At 530, the UE 115-*e* may receive a third indication from the network entity 105-*c* of one or more second TCI states, different from the one or more TCI states, based on transmitting the second indication. For example, the network entity 105-*c* may determine that communications using one or more second TCI states different from the one or more first TCI states may provide increased service for a wireless communications system. In other words, the network entity 105-*c* may decline (e.g., ignore) the recommendation from the UE 115-*e* received via the second indication, and accordingly transmit the third indication to the UE 115-*e*.

At 535, the UE 115-*e* and the network entity 105-*c* may communicate in accordance with the one or more TCI states based on communicating the (e.g., transmitting, receiving)

the second indication. That is, the network entity 105-*c* may determine to use (e.g., switch to) active TCI states in accordance with the recommend TCI states by the UE 115-*e*. In some examples, the UE 115-*e* may transmit one or more uplink signals to the network entity 105-*c* via first one or more antenna elements. The first one or more antenna elements may be selected by the UE 115-*e* based on first one or more antenna element performance thresholds (e.g., corresponding to uplink communications). Additionally, or alternatively, the UE 115-*e* may receive one or more downlink signals from the network entity 105-*c* via second one or more antenna elements. The second one or more antenna elements may be selected by the UE 115-*e* based on second one or more antenna element performance thresholds communicating with a network entity 105-*c* (e.g., corresponding to uplink communications). In some examples, the network entity 105-*c* may include both the first one or more antenna element performance thresholds and the second one or more antenna element performance thresholds in the first indication. Alternatively, the UE 115-*e* and the network entity 105-*c* may communicate in accordance with the one or more second TCI states based on receiving the third indication.

Figure 6:
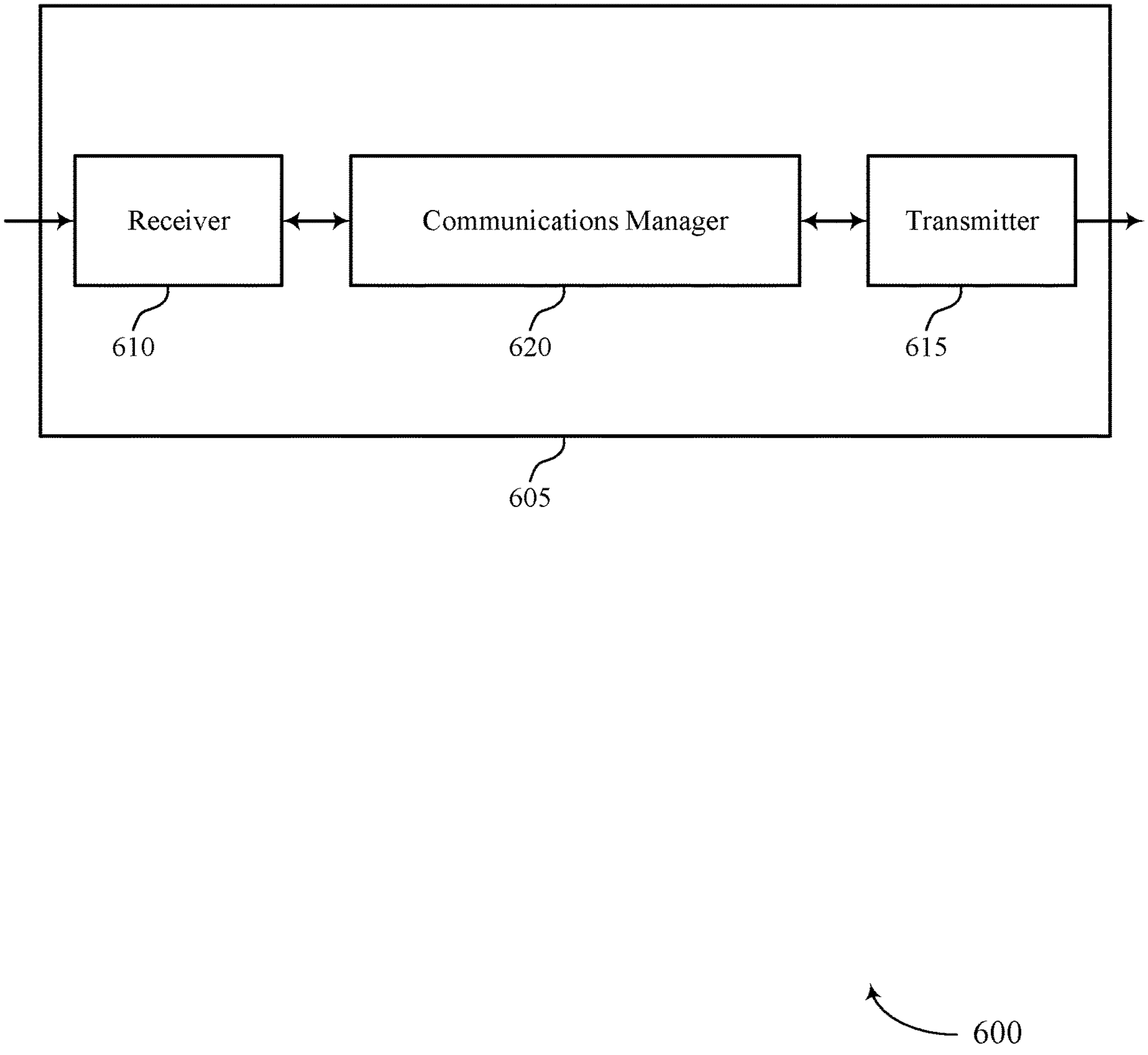
FIGS. 6 and 7 show block diagrams of devices that support methods for antenna group selection with multi-sided antenna modules in accordance with one or more aspects of the present disclosure.

FIG. 6 shows a block diagram 600 of a device 605 that supports methods for antenna group selection with multi-sided antenna modules in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to methods for antenna group selection with multi-sided antenna modules). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods for antenna group selection with multi-sided antenna modules). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of methods for antenna group selection with multi-sided antenna modules as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a first indication of one or more antenna element selection parameters, the one or more antenna element selection parameters including one or more antenna element performance thresholds for antenna element selection by the UE. The communications manager 620 is capable of, configured to, or operable to support a means for transmitting a second indication of one or more TCI states corresponding to usage of one or more antenna elements of the UE, the one or more antenna elements selected by the UE based on the one or more antenna elements satisfying the one or more antenna element performance thresholds.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced power consumption, more efficient utilization of communication resources, and improved data rates, among other benefits.

Figure 7:
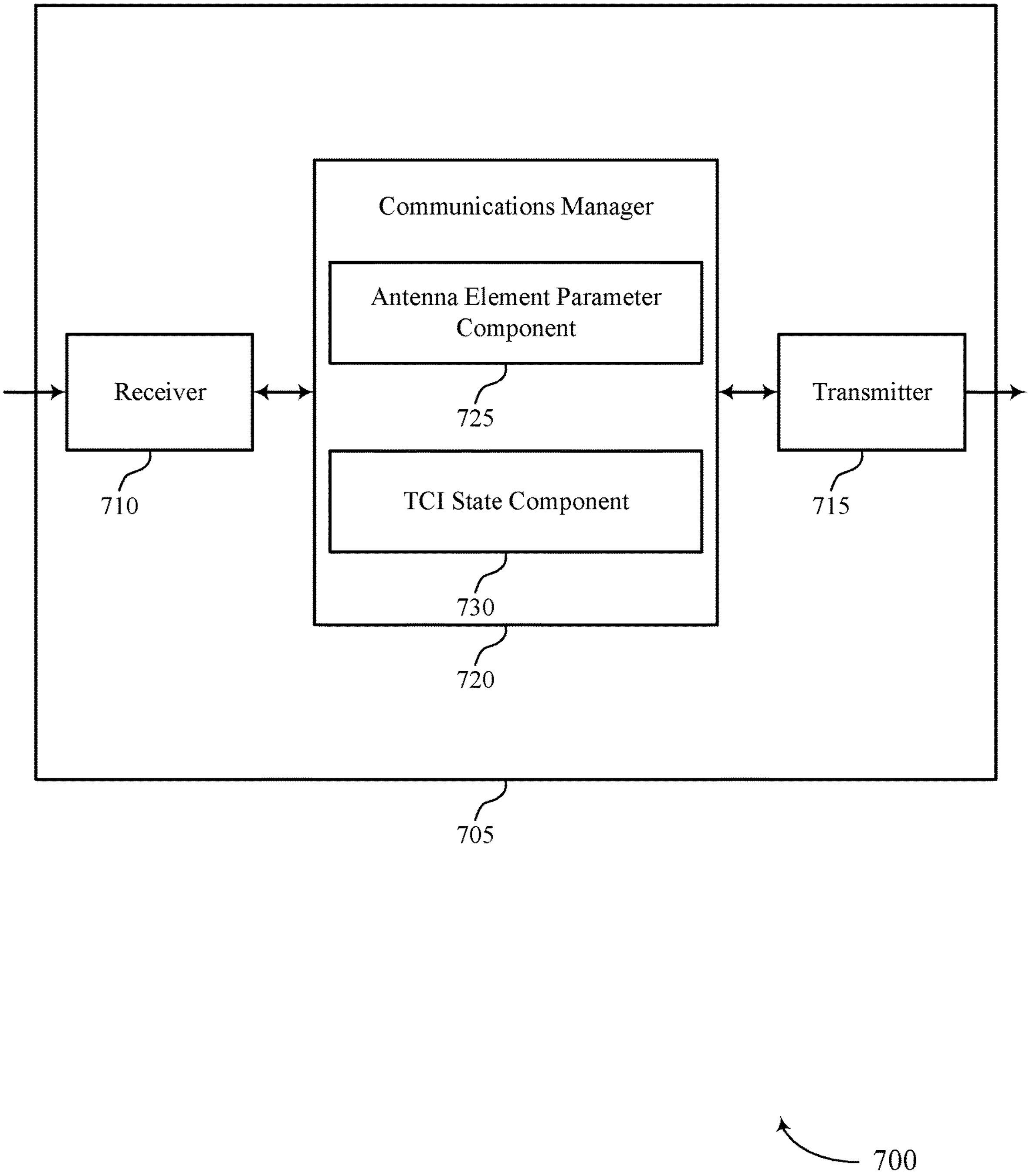

FIG. 7 shows a block diagram 700 of a device 705 that supports methods for antenna group selection with multi-sided antenna modules in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to methods for antenna group selection with multi-sided antenna modules). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to methods for antenna group selection with multi-sided antenna modules). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of methods for antenna group selection with multi-sided antenna modules as described herein. For example, the communications manager 720 may include an antenna element parameter component 725 a TCI state component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The antenna element parameter component 725 is capable of, configured to, or operable to support a means for receiving a first indication of one or more antenna element selection parameters, the one or more antenna element selection parameters including one or more antenna element performance thresholds for antenna element selection by the UE. The TCI state component 730 is capable of, configured to, or operable to support a means for transmitting a second indication of one or more TCI states corresponding to usage of one or more antenna elements of the UE, the one or more antenna elements selected by the UE based on the one or more antenna elements satisfying the one or more antenna element performance thresholds.

Figure 8:
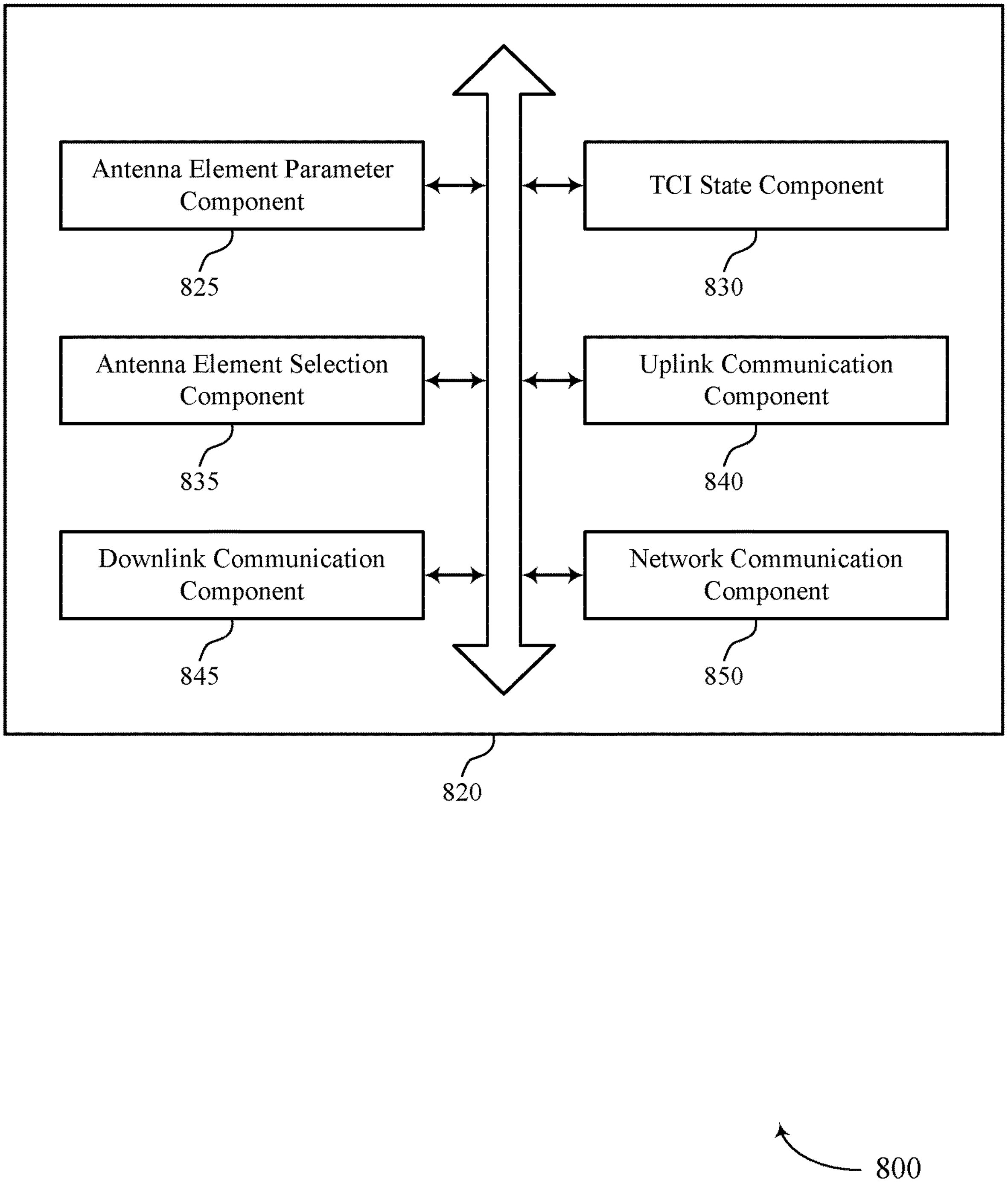
FIG. 8 shows a block diagram of a communications manager that supports methods for antenna group selection with multi-sided antenna modules in accordance with one or more aspects of the present disclosure.

FIG. 8 shows a block diagram 800 of a communications manager 820 that supports methods for antenna group selection with multi-sided antenna modules in accordance with one or more aspects of the present disclosure. The communications manager 820 may be an example of aspects of a communications manager 620, a communications manager 720, or both, as described herein. The communications manager 820, or various components thereof, may be an example of means for performing various aspects of methods for antenna group selection with multi-sided antenna modules as described herein. For example, the communications manager 820 may include an antenna element parameter component 825, a TCI state component 830, an antenna element selection component 835, an uplink communication component 840, a downlink communication component 845, a network communication component 850, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The antenna element parameter component 825 is capable of, configured to, or operable to support a means for receiving a first indication of one or more antenna element selection parameters, the one or more antenna element selection parameters including one or more antenna element performance thresholds for antenna element selection by the UE. The TCI state component 830 is capable of, configured to, or operable to support a means for transmitting a second indication of one or more TCI states (e.g., a first set of TCI states) corresponding to usage of one or more antenna elements of the UE, the one or more antenna elements selected by the UE based on the one or more antenna elements satisfying the one or more antenna element performance thresholds.

In some examples, the one or more antenna element performance thresholds are associated with a feedline loss threshold, a blockage loss threshold, or both, and the antenna element selection component 835 is capable of, configured to, or operable to support a means for selecting a first set of antenna elements based on the one or more antenna elements satisfying a first antenna element performance threshold associated with the feedline loss threshold. In some examples, the one or more antenna element performance thresholds are associated with a feedline loss threshold, a blockage loss threshold, or both, and the antenna element selection component 835 is capable of, configured to, or operable to support a means for selecting a second set of antenna elements different than the first set of antenna elements based on the one or more antenna elements satisfying a second antenna element performance threshold associated with the blockage loss threshold.

In some examples, the one or more antenna element performance thresholds include first one or more antenna element performance thresholds for uplink communications and second one or more antenna element performance thresholds for downlink communications, and the uplink communication component 840 is capable of, configured to, or operable to support a means for transmitting one or more uplink signals via first one or more antenna elements, the first one or more antenna elements selected by the UE based on the first one or more antenna element performance thresholds. In some examples, the one or more antenna element performance thresholds include first one or more antenna element performance thresholds for uplink communications and second one or more antenna element performance thresholds for downlink communications, and the downlink communication component 845 is capable of, configured to, or operable to support a means for receiving one or more downlink signals via second one or more antenna elements, the second one or more antenna elements selected by the UE based on the second one or more antenna element performance thresholds.

In some examples, the one or more antenna element performance thresholds are based on a first size of a first antenna array of the UE, a second size of a second antenna array of a network entity, or both.

In some examples, the antenna element selection component 835 is capable of, configured to, or operable to support a means for selecting the one or more antenna elements from a set of antenna element groups, where each antenna element group of the set of antenna element groups is associated with a same power characteristic.

In some examples, to support receiving the first indication, the antenna element parameter component 825 is capable of, configured to, or operable to support a means for receiving the first indication via an RRC message, a DCI message, a MAC-CE message, or any combination thereof.

In some examples, to support transmitting the second indication, the TCI state component 830 is capable of, configured to, or operable to support a means for transmitting the second indication via an RRC message, a UCI message, a MAC-CE message, or any combination thereof.

In some examples, the antenna element selection component 835 is capable of, configured to, or operable to support a means for selecting the one or more antenna elements based on an antenna element configuration at the UE. In some examples, the antenna element configuration is associated with a geometry of the one or more antenna elements of the UE, an arrangement of the one or more antenna elements of the UE, one or more boresight directions of the one or more antenna elements of the UE, an RFIC configuration, a mapping between one or more RFIC ports and one or more feedlines associated with the one or more antenna elements of the UE, or any combination thereof. In some examples, the one or more antenna elements of the UE includes one or more first sets of antenna elements, each first set of antenna elements associated with a respective set of multiple boresight directions, and one or more second sets of antenna elements, each second set of antenna elements associated with a respective single boresight direction.

In some examples, the network communication component 850 is capable of, configured to, or operable to support a means for communicating with a network entity in accordance with the one or more TCI states based on transmitting the second indication.

In some examples, the TCI state component 830 is capable of, configured to, or operable to support a means for receiving a third indication from a network entity of one or more second TCI states (e.g., a second set of TCI states), different from the one or more TCI states, based on transmitting the second indication. In some examples, the network communication component 850 is capable of, configured to, or operable to support a means for communicating with the network entity in accordance with the one or more second TCI states based on receiving the third indication.

Figure 9:
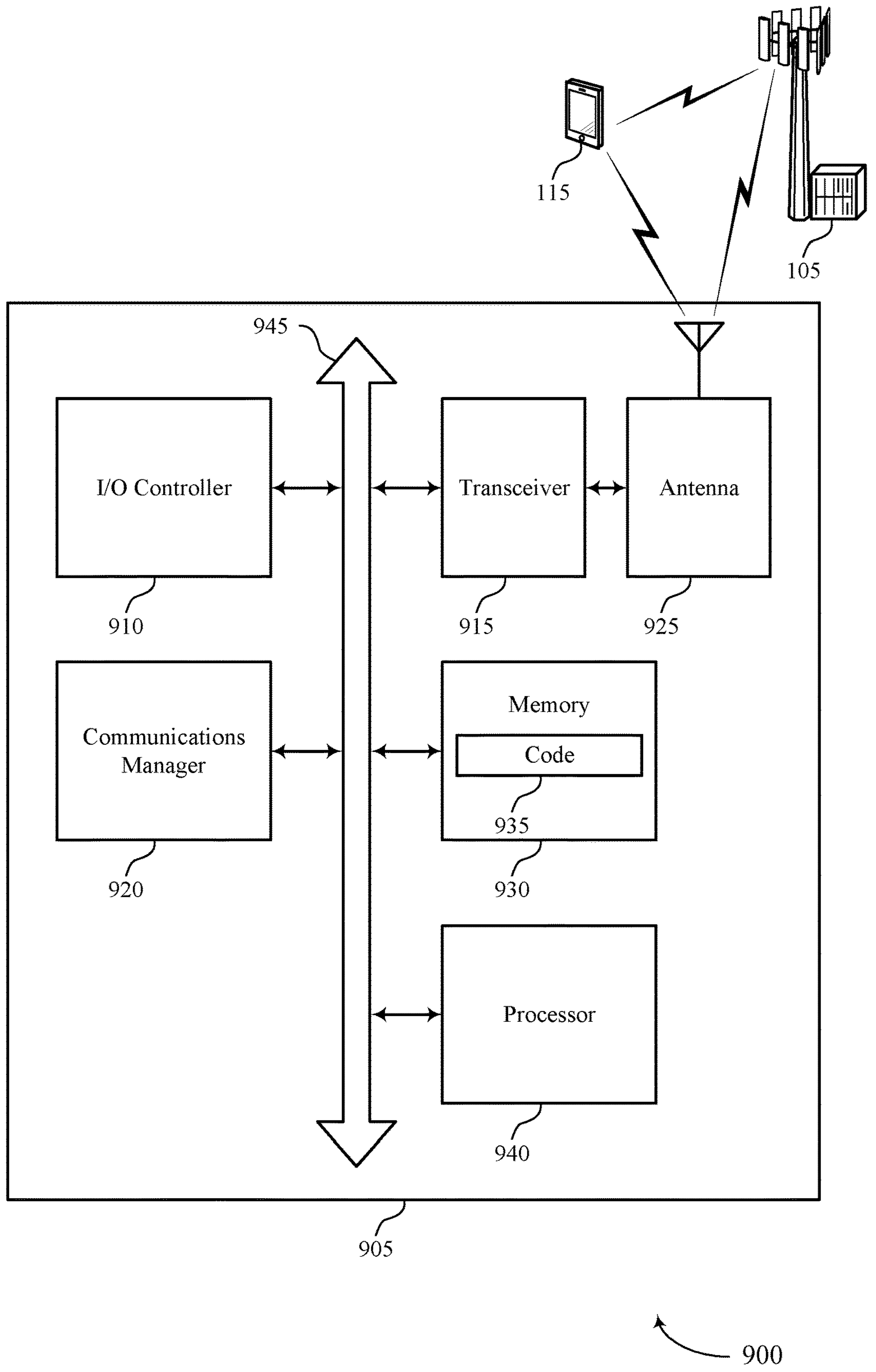
FIG. 9 shows a diagram of a system including a device that supports methods for antenna group selection with multi-sided antenna modules in accordance with one or more aspects of the present disclosure.

FIG. 9 shows a diagram of a system 900 including a device 905 that supports methods for antenna group selection with multi-sided antenna modules in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting methods for antenna group selection with multi-sided antenna modules). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communications in accordance with examples as disclosed herein. For example, the communications manager 920 is capable of, configured to, or operable to support a means for receiving a first indication of one or more antenna element selection parameters, the one or more antenna element selection parameters including one or more antenna element performance thresholds for antenna element selection by the UE. The communications manager 920 is capable of, configured to, or operable to support a means for transmitting a second indication of one or more TCI states corresponding to usage of one or more antenna elements of the UE, the one or more antenna elements selected by the UE based on the one or more antenna elements satisfying the one or more antenna element performance thresholds.

By including or configuring the communications manager 920 in accordance with examples as described herein, the device 905 may support techniques for improved communication reliability, improved user experience related to improved selection of antenna elements, reduced power consumption, more efficient utilization of communication resources, increased spectral efficiency, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of methods for antenna group selection with multi-sided antenna modules as described herein, or the at least one processor 940 and the at least one memory 930 may be otherwise configured to, individually or collectively, perform or support such operations.

Figure 10:
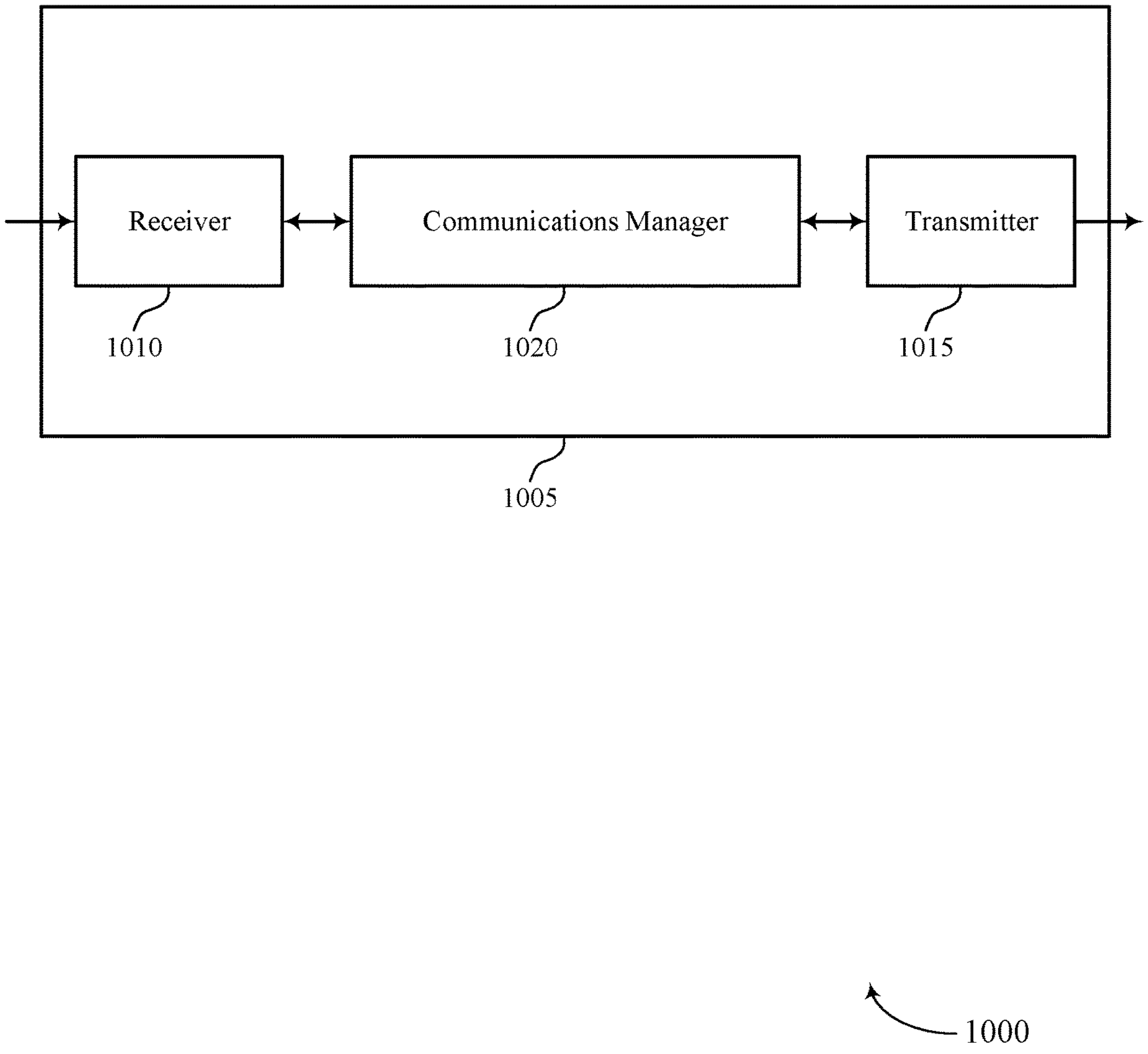
FIGS. 10 and 11 show block diagrams of devices that support methods for antenna group selection with multi-sided antenna modules in accordance with one or more aspects of the present disclosure.

FIG. 10 shows a block diagram 1000 of a device 1005 that supports methods for antenna group selection with multi-sided antenna modules in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of methods for antenna group selection with multi-sided antenna modules as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting a first indication of one or more antenna element selection parameters, the one or more antenna element selection parameters including one or more antenna element performance thresholds for antenna element selection by a UE. The communications manager 1020 is capable of, configured to, or operable to support a means for receiving a second indication of one or more TCI states based on transmitting the first indication, the one or more TCI states corresponding to usage of one or more antenna elements of the UE.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources and improved data rates, among other benefits.

Figure 11:
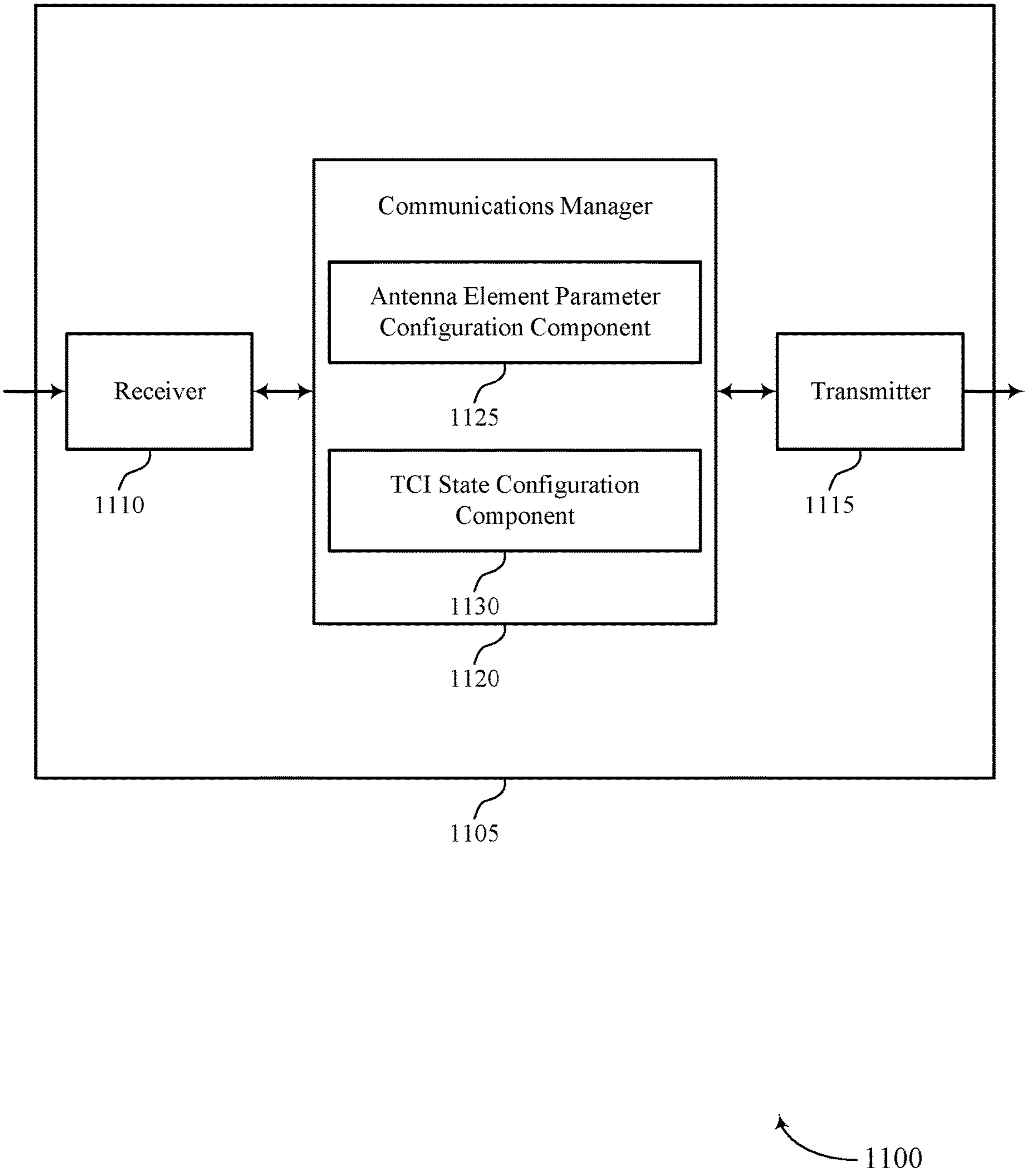

FIG. 11 shows a block diagram 1100 of a device 1105 that supports methods for antenna group selection with multi-sided antenna modules in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of methods for antenna group selection with multi-sided antenna modules as described herein. For example, the communications manager 1120 may include an antenna element parameter configuration component 1125 a TCI state configuration component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The antenna element parameter configuration component 1125 is capable of, configured to, or operable to support a means for transmitting a first indication of one or more antenna element selection parameters, the one or more antenna element selection parameters including one or more antenna element performance thresholds for antenna element selection by a UE. The TCI state configuration component 1130 is capable of, configured to, or operable to support a means for receiving a second indication of one or more TCI states based on transmitting the first indication, the one or more TCI states corresponding to usage of one or more antenna elements of the UE.

Figure 12:
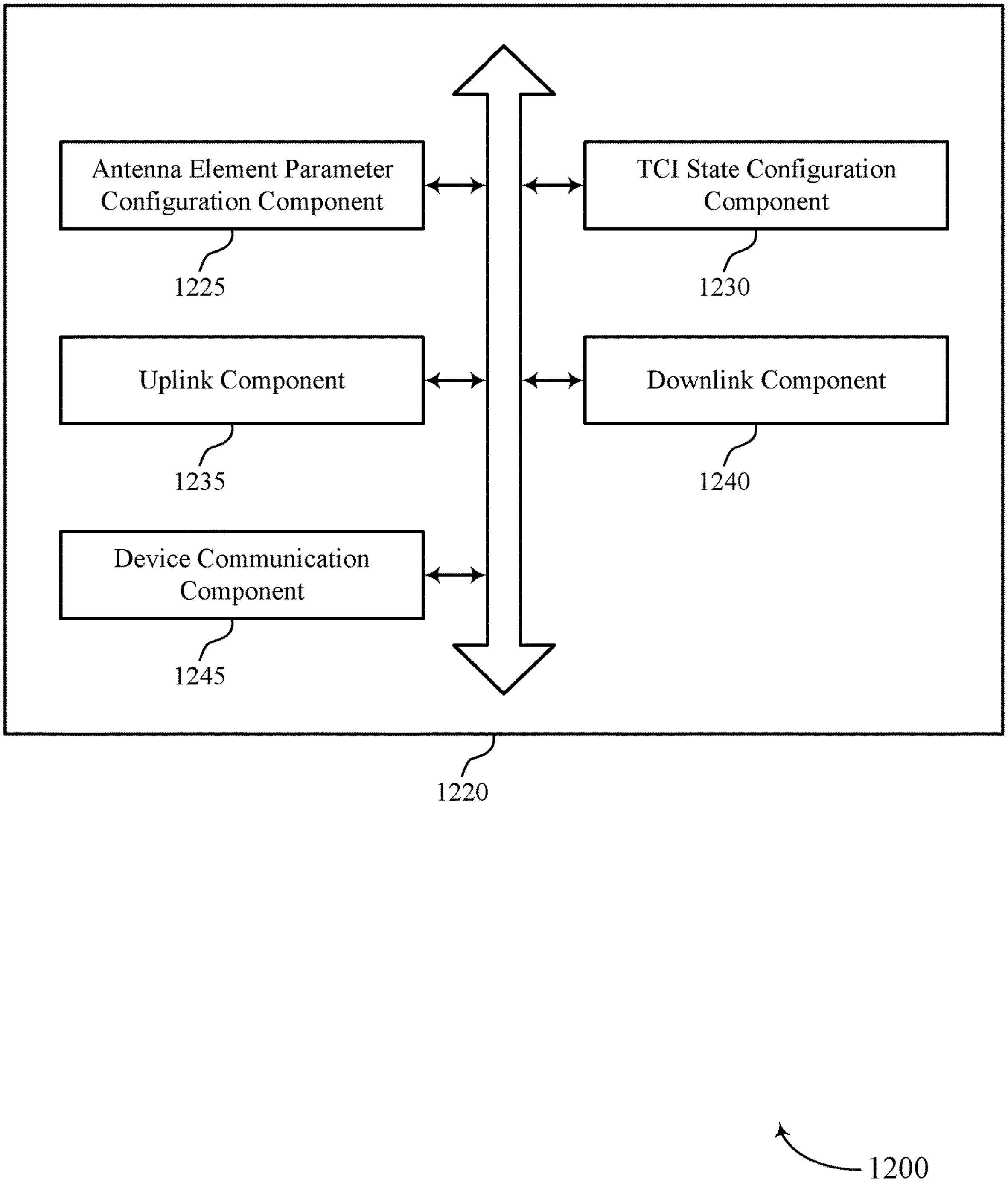
FIG. 12 shows a block diagram of a communications manager that supports methods for antenna group selection with multi-sided antenna modules in accordance with one or more aspects of the present disclosure.

FIG. 12 shows a block diagram 1200 of a communications manager 1220 that supports methods for antenna group selection with multi-sided antenna modules in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of methods for antenna group selection with multi-sided antenna modules as described herein. For example, the communications manager 1220 may include an antenna element parameter configuration component 1225, a TCI state configuration component 1230, an uplink component 1235, a downlink component 1240, a device communication component 1245, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The antenna element parameter configuration component 1225 is capable of, configured to, or operable to support a means for transmitting a first indication of one or more antenna element selection parameters, the one or more antenna element selection parameters including one or more antenna element performance thresholds for antenna element selection by a UE. The TCI state configuration component 1230 is capable of, configured to, or operable to support a means for receiving a second indication of one or more TCI states (e.g., a first set of TCI states) based on transmitting the first indication, the one or more TCI states corresponding to usage of one or more antenna elements of the UE.

In some examples, to support transmitting the first indication, the antenna element parameter configuration component 1225 is capable of, configured to, or operable to support a means for selecting the one or more antenna element performance thresholds based on a performance tradeoff between a blockage loss and a feedline loss, an antenna panel configuration supported by the UE, or both. In some examples, to support transmitting the first indication, the antenna element parameter configuration component 1225 is capable of, configured to, or operable to support a means for transmitting the first indication of the one or more antenna element selection parameters based on the selecting. In some examples, the one or more antenna element performance thresholds are associated with a feedline loss threshold, a blockage loss threshold, or both.

In some examples, the one or more antenna element performance thresholds include first one or more antenna element performance thresholds for uplink communications and second one or more antenna element performance thresholds for downlink communications, and the uplink component 1235 is capable of, configured to, or operable to support a means for receiving one or more uplink signals based on the first one or more antenna element performance thresholds. In some examples, the one or more antenna element performance thresholds include first one or more antenna element performance thresholds for uplink communications and second one or more antenna element performance thresholds for downlink communications, and the downlink component 1240 is capable of, configured to, or operable to support a means for transmitting one or more downlink signals based on the second one or more antenna element performance thresholds.

In some examples, the one or more antenna element performance thresholds are based on a first size of a first antenna array at the UE, a second size of a second antenna array at the network entity, or both.

In some examples, to support transmitting the first indication, the antenna element parameter configuration component 1225 is capable of, configured to, or operable to support a means for transmitting the first indication via an RRC message, a DCI message, a MAC-CE message, or any combination thereof.

In some examples, to support receiving the second indication, the TCI state configuration component 1230 is capable of, configured to, or operable to support a means for receiving the second indication via an RRC message, a UCI message, a MAC-CE message, or any combination thereof.

In some examples, the device communication component 1245 is capable of, configured to, or operable to support a means for communicating with one or more UEs including the UE in accordance with the one or more TCI states based on receiving the second indication.

In some examples, the TCI state configuration component 1230 is capable of, configured to, or operable to support a means for transmitting a third indication to the UE of one or more second TCI states (e.g., a second set of TCI states), different from the one or more TCI states, based on receiving the second indication. In some examples, the device communication component 1245 is capable of, configured to, or operable to support a means for communicating with one or more UEs including the UE in accordance with the one or more second TCI states based on transmitting the third indication.

Figure 13:
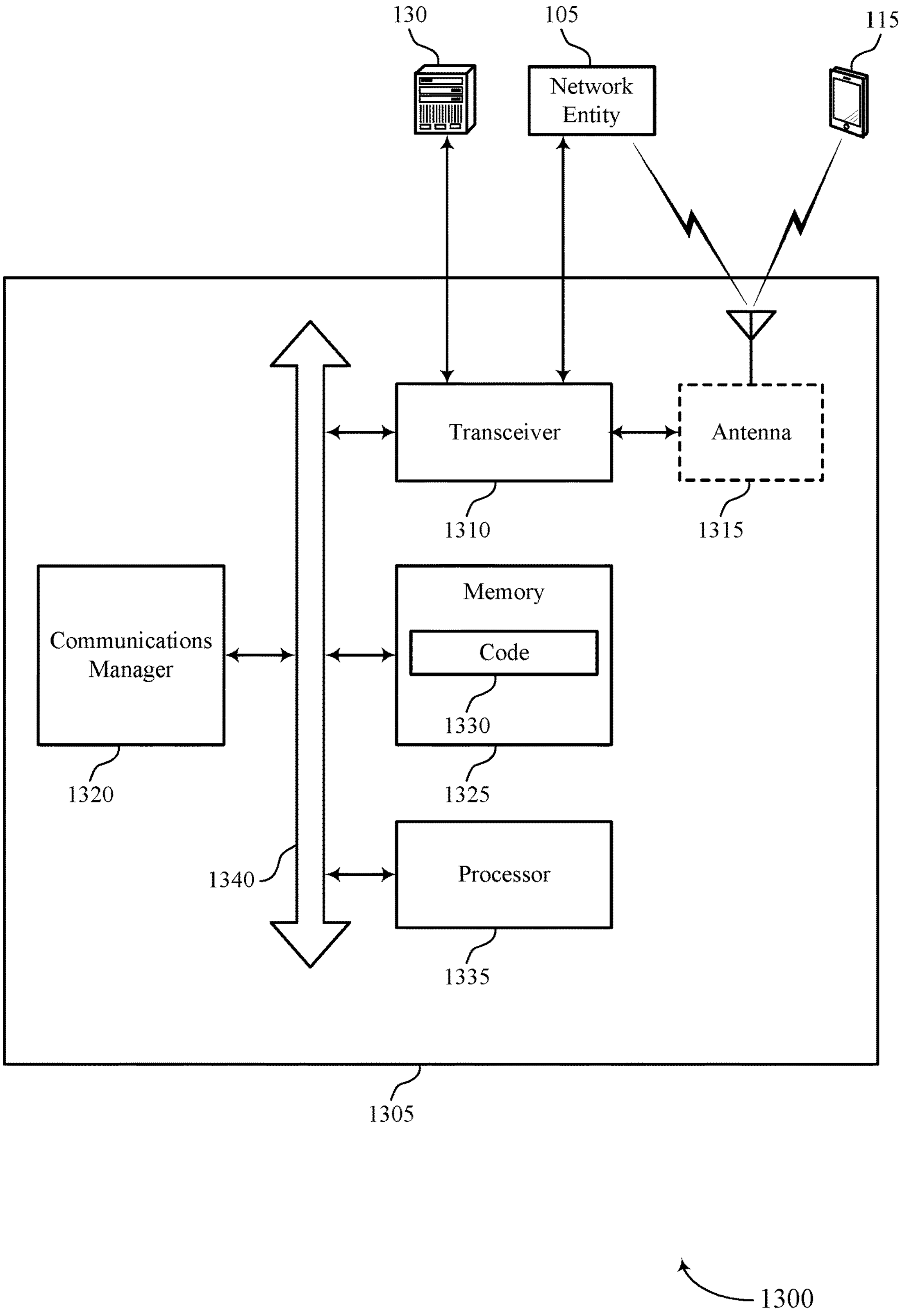
FIG. 13 shows a diagram of a system including a device that supports methods for antenna group selection with multi-sided antenna modules in accordance with one or more aspects of the present disclosure.

FIG. 13 shows a diagram of a system 1300 including a device 1305 that supports methods for antenna group selection with multi-sided antenna modules in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting methods for antenna group selection with multi-sided antenna modules). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some implementations, the at least one processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the at least one processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting a first indication of one or more antenna element selection parameters, the one or more antenna element selection parameters including one or more antenna element performance thresholds for antenna element selection by a UE. The communications manager 1320 is capable of, configured to, or operable to support a means for receiving a second indication of one or more TCI states based on transmitting the first indication, the one or more TCI states corresponding to usage of one or more antenna elements of the UE.

By including or configuring the communications manager 1320 in accordance with examples as described herein, the device 1305 may support techniques for improved communication reliability, improved user experience related to increased spectral efficiency, reduced power consumption, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of methods for antenna group selection with multi-sided antenna modules as described herein, or the at least one processor 1335 and the at least one memory 1325 may be otherwise configured to, individually or collectively, perform or support such operations.

Figure 14:
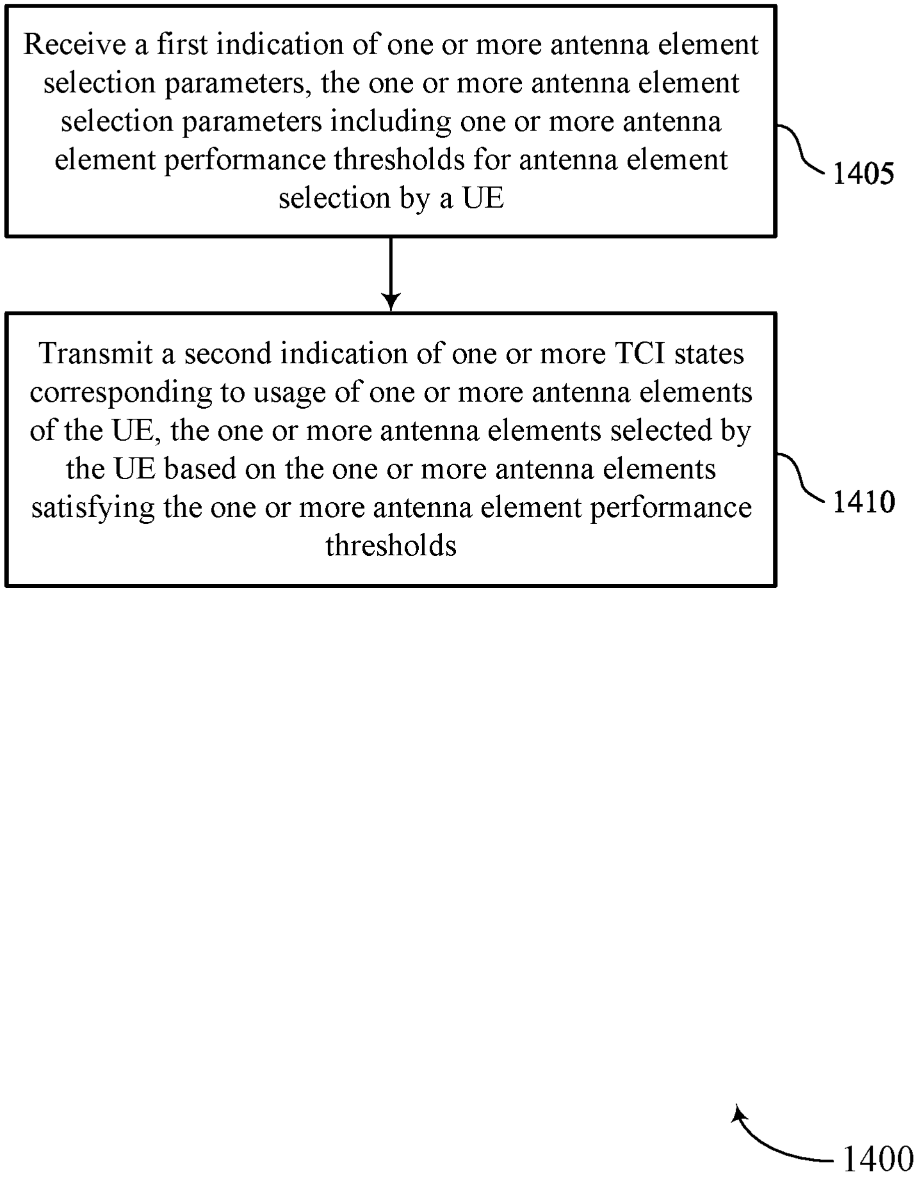
FIGS. 14 through 19 show flowcharts illustrating methods that support methods for antenna group selection with multi-sided antenna modules in accordance with one or more aspects of the present disclosure.

FIG. 14 shows a flowchart illustrating a method 1400 that supports methods for antenna group selection with multi-sided antenna modules in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first indication of one or more antenna element selection parameters, the one or more antenna element selection parameters including one or more antenna element performance thresholds for antenna element selection by a UE. The operations of block 1405 may be performed in accordance with examples as disclosed herein. In some examples, aspects of the operations of 1405 may be performed by an antenna element parameter component 825 as described with reference to FIG. 8.

At 1410, the method may include transmitting a second indication of one or more TCI states corresponding to usage of one or more antenna elements of the UE, the one or more antenna elements selected by the UE based on the one or more antenna elements satisfying the one or more antenna element performance thresholds. The operations of block 1410 may be performed in accordance with examples as disclosed herein. In some examples, aspects of the operations of 1410 may be performed by a TCI state component 830 as described with reference to FIG. 8.

Figure 15:
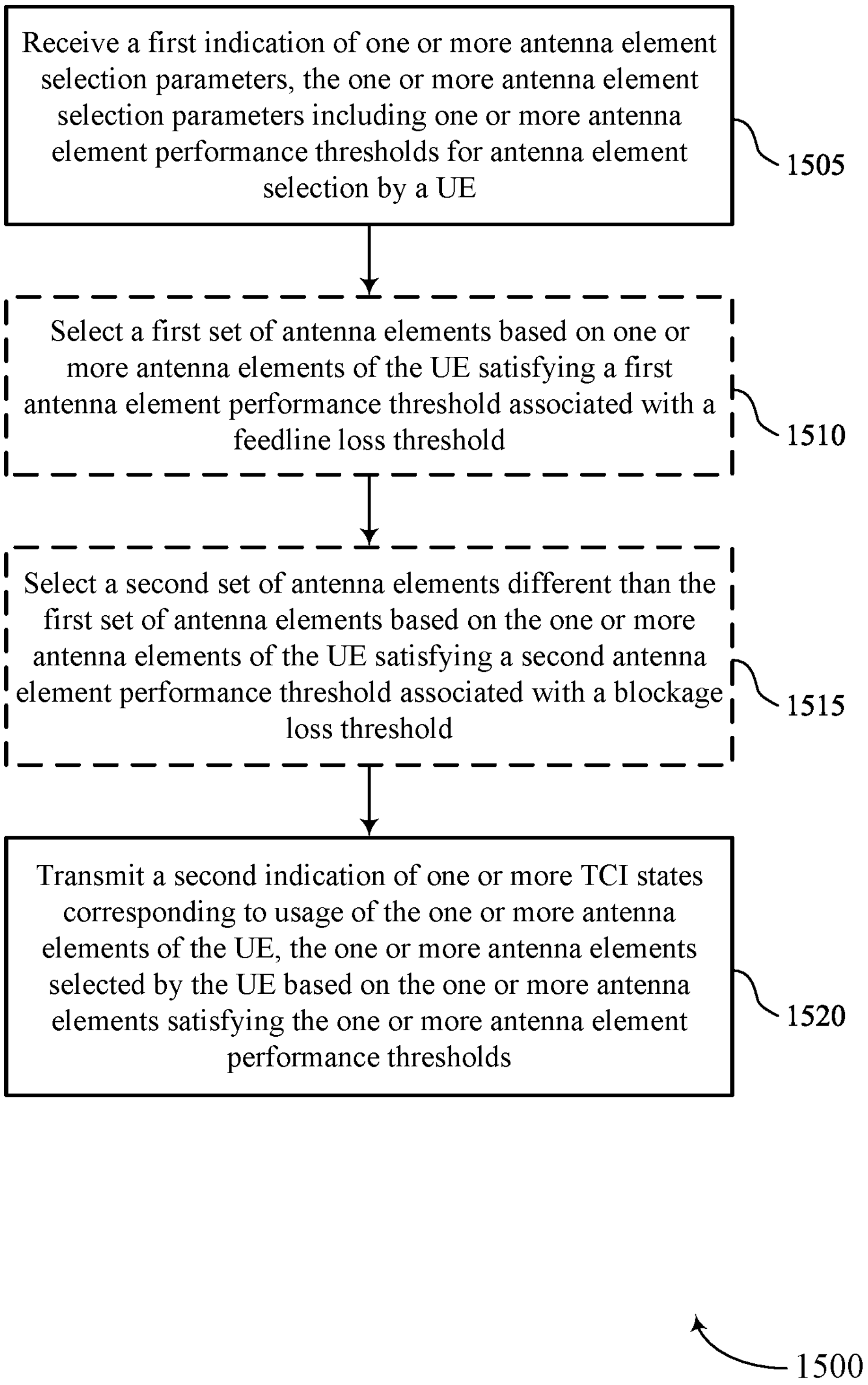

FIG. 15 shows a flowchart illustrating a method 1500 that supports methods for antenna group selection with multi-sided antenna modules in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first indication of one or more antenna element selection parameters, the one or more antenna element selection parameters including one or more antenna element performance thresholds for antenna element selection by a UE. The operations of block 1505 may be performed in accordance with examples as disclosed herein. In some examples, aspects of the operations of 1505 may be performed by an antenna element parameter component 825 as described with reference to FIG. 8.

At 1510, the method may include selecting a first set of antenna elements based on one or more antenna elements of the UE satisfying a first antenna element performance threshold associated with a feedline loss threshold. The operations of block 1510 may be performed in accordance with examples as disclosed herein. In some examples, aspects of the operations of 1510 may be performed by an antenna element selection component 835 as described with reference to FIG. 8.

At 1515, the method may include selecting a second set of antenna elements different than the first set of antenna elements based on the one or more antenna elements of the UE satisfying a second antenna element performance threshold associated with a blockage loss threshold. The operations of block 1515 may be performed in accordance with examples as disclosed herein. In some examples, aspects of the operations of 1515 may be performed by an antenna element selection component 835 as described with reference to FIG. 8.

At 1520, the method may include transmitting a second indication of one or more TCI states corresponding to usage of the one or more antenna elements of the UE, the one or more antenna elements selected by the UE based on the one or more antenna elements satisfying the one or more antenna element performance thresholds. The operations of block 1520 may be performed in accordance with examples as disclosed herein. In some examples, aspects of the operations of 1520 may be performed by a TCI state component 830 as described with reference to FIG. 8.

Figure 16:
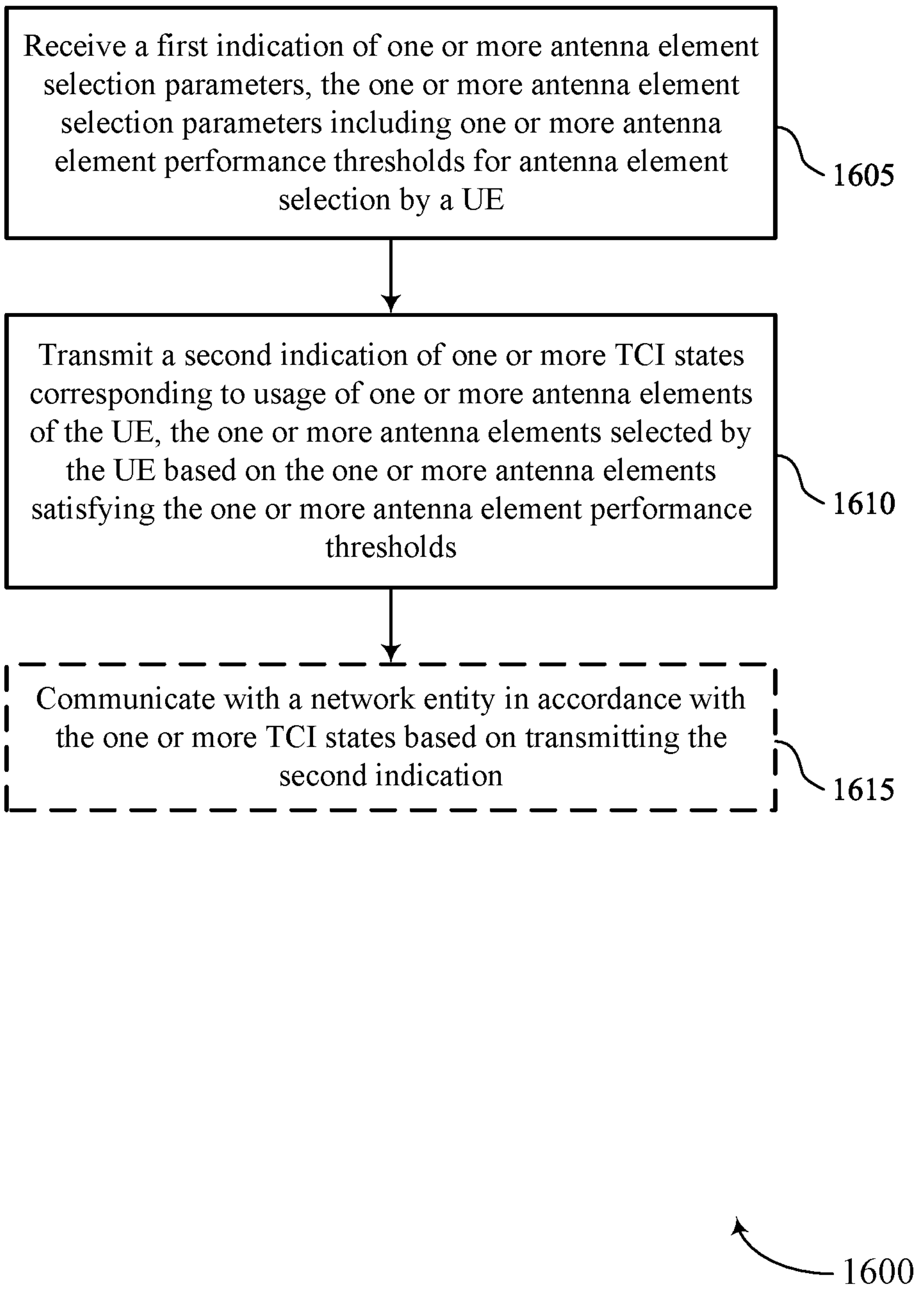

FIG. 16 shows a flowchart illustrating a method 1600 that supports methods for antenna group selection with multi-sided antenna modules in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first indication of one or more antenna element selection parameters, the one or more antenna element selection parameters including one or more antenna element performance thresholds for antenna element selection by a UE. The operations of block 1605 may be performed in accordance with examples as disclosed herein. In some examples, aspects of the operations of 1605 may be performed by an antenna element parameter component 825 as described with reference to FIG. 8.

At 1610, the method may include transmitting a second indication of one or more TCI states corresponding to usage of one or more antenna elements of the UE, the one or more antenna elements selected by the UE based on the one or more antenna elements satisfying the one or more antenna element performance thresholds. The operations of block 1610 may be performed in accordance with examples as disclosed herein. In some examples, aspects of the operations of 1610 may be performed by a TCI state component 830 as described with reference to FIG. 8.

At 1615, the method may include communicating with a network entity in accordance with the one or more TCI states based on transmitting the second indication. The operations of block 1615 may be performed in accordance with examples as disclosed herein. In some examples, aspects of the operations of 1615 may be performed by a network communication component 850 as described with reference to FIG. 8.

Figure 17:
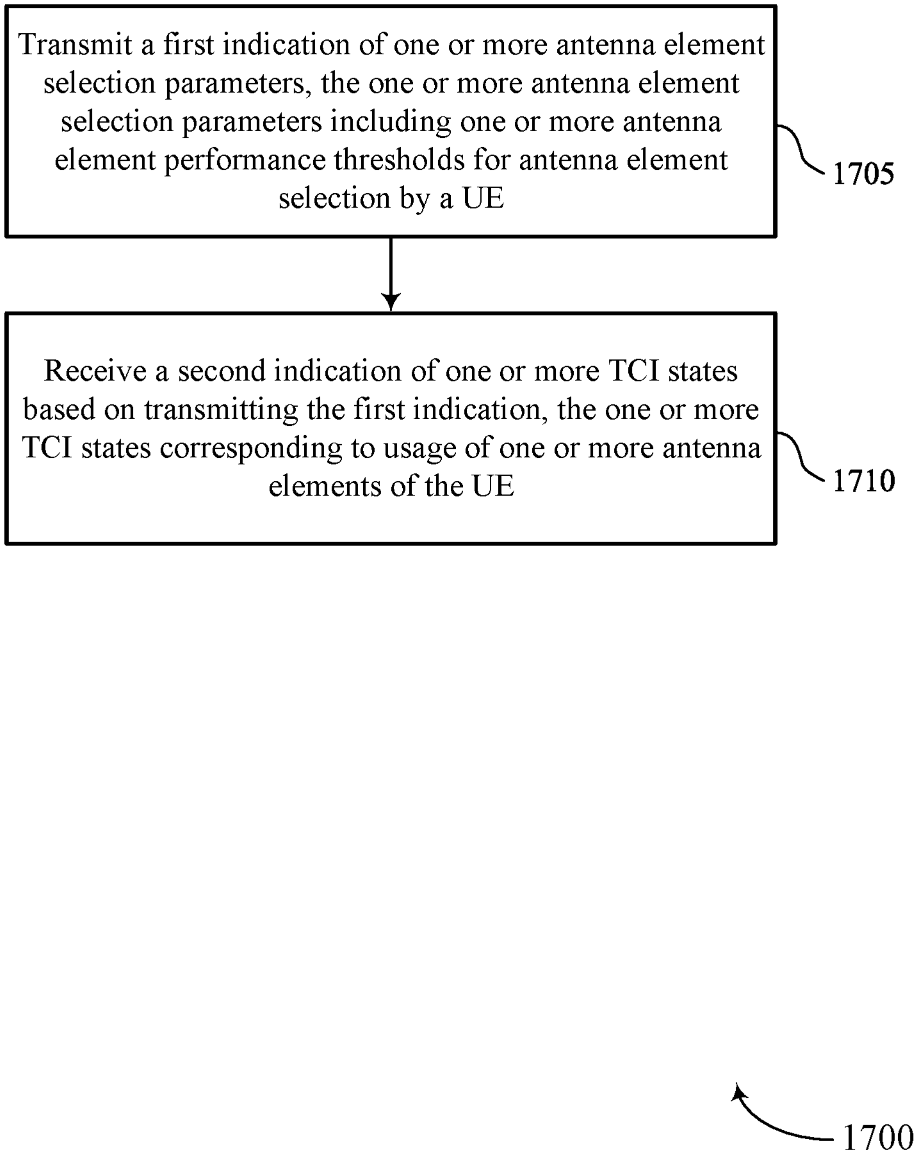

FIG. 17 shows a flowchart illustrating a method 1700 that supports methods for antenna group selection with multi-sided antenna modules in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a first indication of one or more antenna element selection parameters, the one or more antenna element selection parameters including one or more antenna element performance thresholds for antenna element selection by a UE. The operations of block 1705 may be performed in accordance with examples as disclosed herein. In some examples, aspects of the operations of 1705 may be performed by an antenna element parameter configuration component 1225 as described with reference to FIG. 12.

At 1710, the method may include receiving a second indication of one or more TCI states based on transmitting the first indication, the one or more TCI states corresponding to usage of one or more antenna elements of the UE. The operations of block 1710 may be performed in accordance with examples as disclosed herein. In some examples, aspects of the operations of 1710 may be performed by a TCI state configuration component 1230 as described with reference to FIG. 12.

Figure 18:
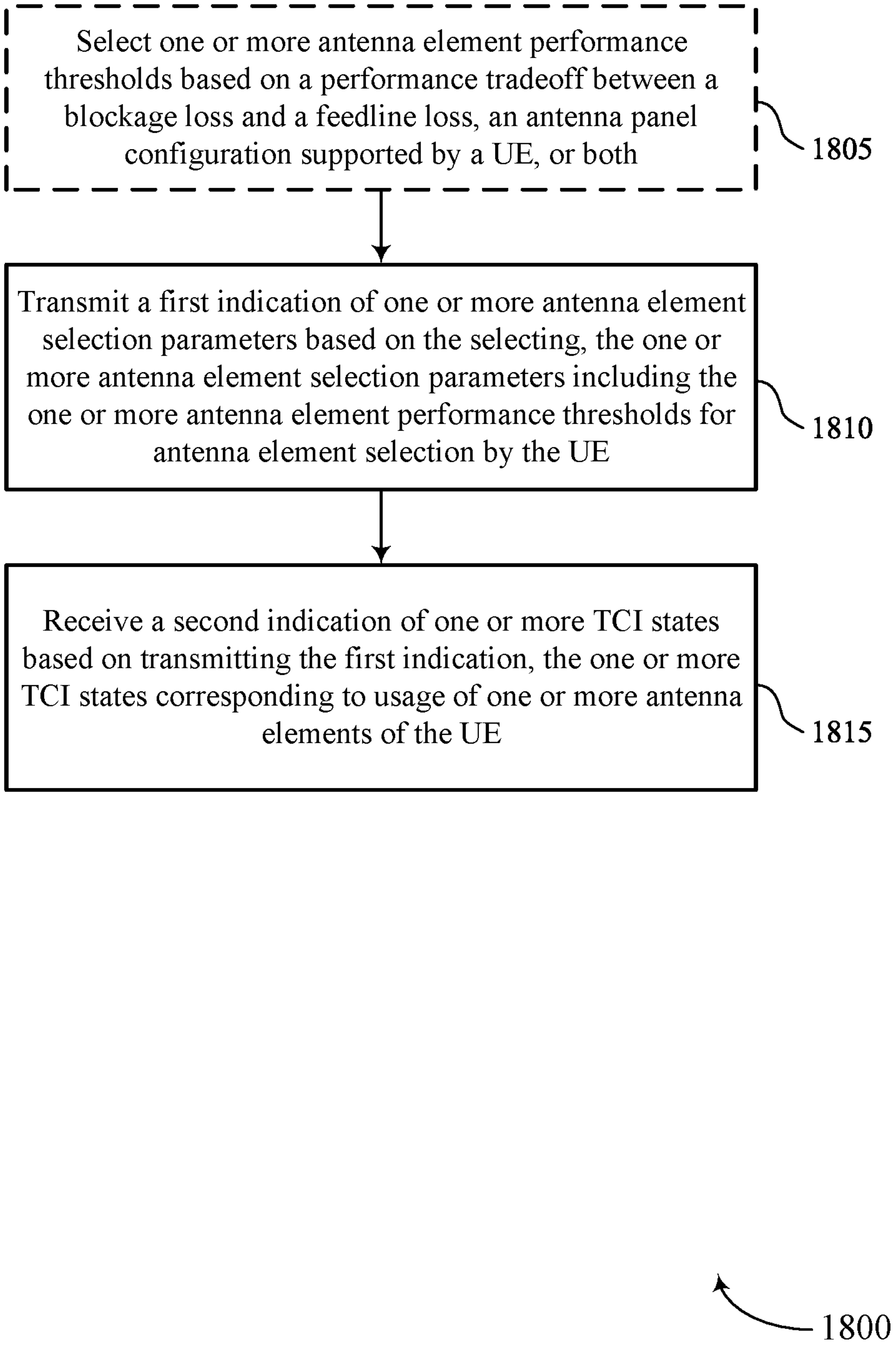

FIG. 18 shows a flowchart illustrating a method 1800 that supports methods for antenna group selection with multi-sided antenna modules in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include selecting one or more antenna element performance thresholds based on a performance tradeoff between a blockage loss and a feedline loss, an antenna panel configuration supported by a UE, or both. The operations of block 1805 may be performed in accordance with examples as disclosed herein. In some examples, aspects of the operations of 1805 may be performed by an antenna element parameter configuration component 1225 as described with reference to FIG. 12.

At 1810, the method may include transmitting a first indication of one or more antenna element selection parameters based on the selecting, the one or more antenna element selection parameters including the one or more antenna element performance thresholds for antenna element selection by the UE. The operations of block 1810 may be performed in accordance with examples as disclosed herein. In some examples, aspects of the operations of 1810 may be performed by an antenna element parameter configuration component 1225 as described with reference to FIG. 12.

At 1815, the method may include receiving a second indication of one or more TCI states based on transmitting the first indication, the one or more TCI states corresponding to usage of one or more antenna elements of the UE. The operations of block 1815 may be performed in accordance with examples as disclosed herein. In some examples, aspects of the operations of 1815 may be performed by a TCI state configuration component 1230 as described with reference to FIG. 12.

Figure 19:
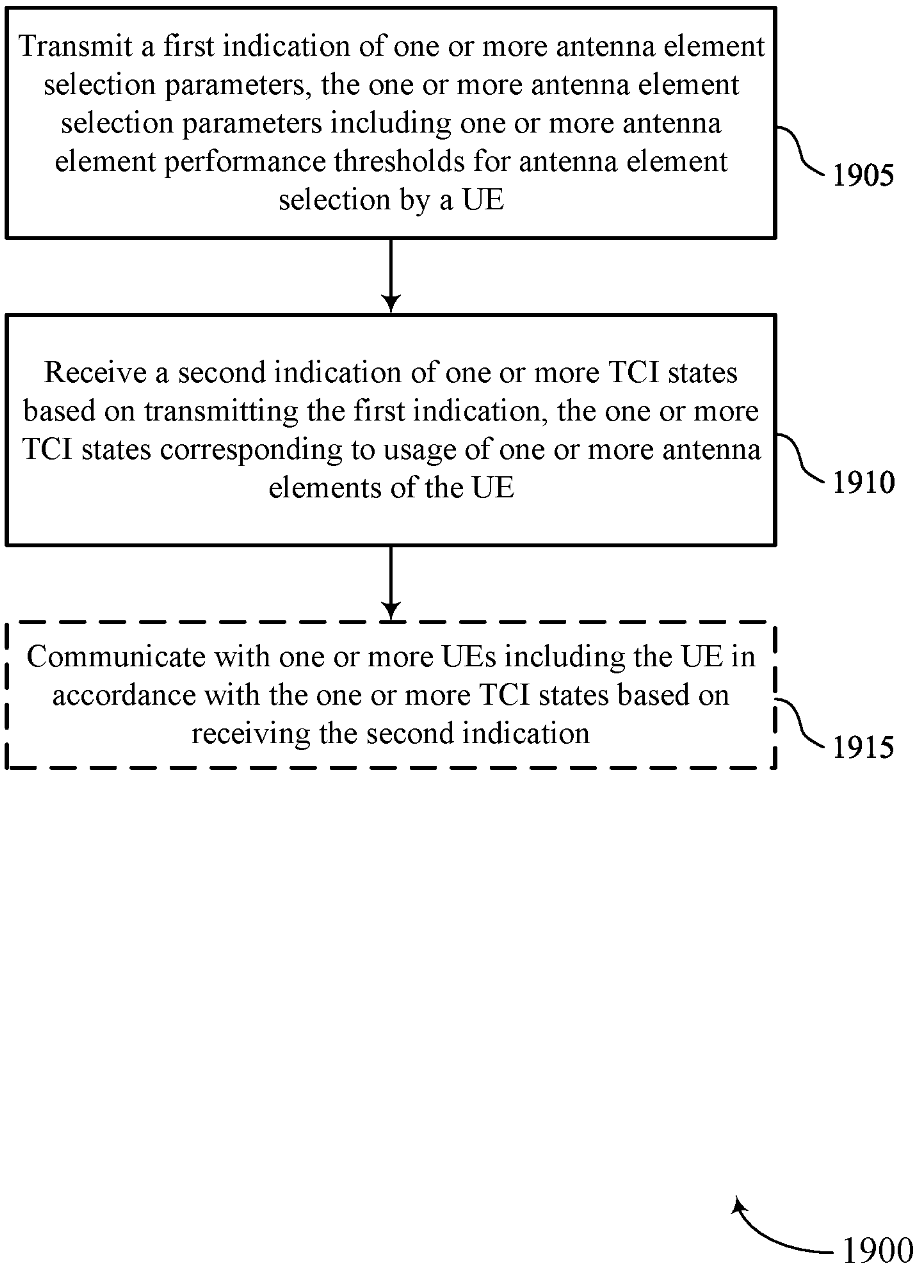

FIG. 19 shows a flowchart illustrating a method 1900 that supports methods for antenna group selection with multi-sided antenna modules in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a first indication of one or more antenna element selection parameters, the one or more antenna element selection parameters including one or more antenna element performance thresholds for antenna element selection by a UE. The operations of block 1905 may be performed in accordance with examples as disclosed herein. In some examples, aspects of the operations of 1905 may be performed by an antenna element parameter configuration component 1225 as described with reference to FIG. 12.

At 1910, the method may include receiving a second indication of one or more TCI states based on transmitting the first indication, the one or more TCI states corresponding to usage of one or more antenna elements of the UE. The operations of block 1910 may be performed in accordance with examples as disclosed herein. In some examples, aspects of the operations of 1910 may be performed by a TCI state configuration component 1230 as described with reference to FIG. 12.

At 1915, the method may include communicating with one or more UEs including the UE in accordance with the one or more TCI states based on receiving the second indication. The operations of block 1915 may be performed in accordance with examples as disclosed herein. In some examples, aspects of the operations of 1915 may be performed by a device communication component 1245 as described with reference to FIG. 12.

The following provides an overview of aspects of the present disclosure:

Aspect 1: A method for wireless communications by a UE, comprising: receiving a first indication of one or more antenna element selection parameters, the one or more antenna element selection parameters comprising one or more antenna element performance thresholds for antenna element selection by the UE; and transmitting a second indication of one or more TCI states corresponding to usage of one or more antenna elements of the UE, the one or more antenna elements selected by the UE based at least in part on the one or more antenna elements satisfying the one or more antenna element performance thresholds.

Aspect 2: The method of aspect 1, wherein the one or more antenna element performance thresholds are associated with a feedline loss threshold, a blockage loss threshold, or both, the method further comprising: selecting a first set of antenna elements based at least in part on the one or more antenna elements satisfying a first antenna element performance threshold associated with the feedline loss threshold; and selecting a second set of antenna elements different than the first set of antenna elements based at least in part on the one or more antenna elements satisfying a second antenna element performance threshold associated with the blockage loss threshold.

Aspect 3: The method of any of aspects 1 through 2, wherein the one or more antenna element performance thresholds comprise first one or more antenna element performance thresholds for uplink communications and second one or more antenna element performance thresholds for downlink communications, the method further comprising: transmitting one or more uplink signals via first one or more antenna elements, the first one or more antenna elements selected by the UE based at least in part on the first one or more antenna element performance thresholds; and receiving one or more downlink signals via second one or more antenna elements, the second one or more antenna elements selected by the UE based at least in part on the second one or more antenna element performance thresholds.

Aspect 4: The method of any of aspects 1 through 3, wherein the one or more antenna element performance thresholds are based at least in part on a first size of a first antenna array of the UE, a second size of a second antenna array of a network entity, or both.

Aspect 5: The method of any of aspects 1 through 4, further comprising: selecting the one or more antenna elements from a set of antenna element groups, wherein each antenna element group of the set of antenna element groups is associated with a same power characteristic.

Aspect 6: The method of any of aspects 1 through 5, wherein receiving the first indication comprises: receiving the first indication via an RRC message, a DCI message, a MAC-CE message, or any combination thereof.

Aspect 7: The method of any of aspects 1 through 6, wherein transmitting the second indication comprises: transmitting the second indication via an RRC message, UCI message, a MAC-CE message, or any combination thereof.

Aspect 8: The method of any of aspects 1 through 7, further comprising: selecting the one or more antenna elements based at least in part on an antenna element configuration at the UE.

Aspect 9: The method of aspect 8, wherein the antenna element configuration is associated with a geometry of the one or more antenna elements of the UE, an arrangement of the one or more antenna elements of the UE, one or more boresight directions of the one or more antenna elements of the UE, an RFIC configuration, a mapping between one or more RFIC ports and one or more feedlines associated with the one or more antenna elements of the UE, or any combination thereof.

Aspect 10: The method of aspect 9, wherein the one or more antenna elements of the UE comprises one or more first sets of antenna elements, each first set of antenna elements associated with a respective plurality of boresight directions, and one or more second sets of antenna elements, each second set of antenna elements associated with a respective single boresight direction.

Aspect 11: The method of any of aspects 1 through 10, further comprising: communicating with a network entity in accordance with the one or more TCI states based at least in part on transmitting the second indication.

Aspect 12: The method of any of aspects 1 through 10, further comprising: receiving a third indication from a network entity of one or more second TCI states, different from the one or more TCI states, based at least in part on transmitting the second indication; and communicating with the network entity in accordance with the one or more second TCI states based at least in part on receiving the third indication.

Aspect 13: A method for wireless communications by a network entity, comprising: transmitting a first indication of one or more antenna element selection parameters, the one or more antenna element selection parameters comprising one or more antenna element performance thresholds for antenna element selection by a UE; and receiving a second indication of one or more TCI states based at least in part on transmitting the first indication, the one or more TCI states corresponding to usage of one or more antenna elements of the UE.

Aspect 14: The method of aspect 13, wherein transmitting the first indication comprises: selecting the one or more antenna element performance thresholds based at least in part on a performance tradeoff between a blockage loss and a feedline loss, an antenna panel configuration supported by the UE, or both; and transmitting the first indication of the one or more antenna element selection parameters based at least in part on the selecting.

Aspect 15: The method of any of aspects 13 through 14, wherein the one or more antenna element performance thresholds are associated with a feedline loss threshold, a blockage loss threshold, or both.

Aspect 16: The method of any of aspects 13 through 15, wherein the one or more antenna element performance thresholds comprise first one or more antenna element performance thresholds for uplink communications and second one or more antenna element performance thresholds for downlink communications, the method further comprising: receiving one or more uplink signals based at least in part on the first one or more antenna element performance thresholds; and transmitting one or more downlink signals based at least in part on the second one or more antenna element performance thresholds.

Aspect 17: The method of any of aspects 13 through 16, wherein the one or more antenna element performance thresholds are based at least in part on a first size of a first antenna array at the UE, a second size of a second antenna array at the network entity, or both.

Aspect 18: The method of any of aspects 13 through 17, wherein transmitting the first indication comprises: transmitting the first indication via an RRC message, a DCI message, a MAC-CE message, or any combination thereof.

Aspect 19: The method of any of aspects 13 through 18, wherein receiving the second indication comprises: receiving the second indication via an RRC message, UCI message, a MAC-CE message, or any combination thereof.

Aspect 20: The method of any of aspects 13 through 19, further comprising: communicating with one or more UEs including the UE in accordance with the one or more TCI states based at least in part on receiving the second indication.

Aspect 21: The method of any of aspects 13 through 19, further comprising: transmitting a third indication to the UE of one or more second TCI states, different from the one or more TCI states, based at least in part on receiving the second indication; and communicating with one or more UEs including the UE in accordance with the one or more second TCI states based at least in part on transmitting the third indication.

Aspect 22: A UE for wireless communications, comprising one or more memories storing processor-executable code, and one or more processors coupled with the one or more memories and individually or collectively operable to execute the code to cause the UE to perform a method of any of aspects 1 through 12.

Aspect 23: A UE for wireless communications, comprising at least one means for performing a method of any of aspects 1 through 12.

Aspect 24: A non-transitory computer-readable medium storing code for wireless communications, the code comprising instructions executable by a processor to perform a method of any of aspects 1 through 12.

Aspect 25: A network entity for wireless communications, comprising one or more memories storing processor-executable code, and one or more processors coupled with the one or more memories and individually or collectively operable to execute the code to cause the network entity to perform a method of any of aspects 13 through 21.

Aspect 26: A network entity for wireless communications, comprising at least one means for performing a method of any of aspects 13 through 21.

Aspect 27: A non-transitory computer-readable medium storing code for wireless communications, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first indication of one or more antenna element selection parameters, the one or more antenna element selection parameters comprising one or more antenna element performance thresholds for antenna element selection by the UE, wherein the one or more antenna element performance thresholds are associated with a feedline loss threshold, a blockage loss threshold, or both; and transmit a second indication of one or more transmission configuration indicator (TCI) states corresponding to usage of one or more antenna elements of the UE, the one or more antenna elements selected by the UE based at least in part on the one or more antenna elements satisfying the one or more antenna element performance thresholds, wherein each TCI state of the one or more TCI states is associated with a respective spatial resource for communications via the one or more antenna elements.

2. The UE of claim 1, wherein the one or more processors are individually or collectively further operable to execute the code to cause the UE to:

select a first set of antenna elements based at least in part on the one or more antenna elements satisfying a first antenna element performance threshold associated with the feedline loss threshold; and select a second set of antenna elements different than the first set of antenna elements based at least in part on the one or more antenna elements satisfying a second antenna element performance threshold associated with the blockage loss threshold.

3. The UE of claim 1, wherein the one or more antenna element performance thresholds comprise first one or more antenna element performance thresholds for uplink communications and second one or more antenna element performance thresholds for downlink communications, and the one or more processors are individually or collectively further operable to execute the code to cause the UE to:

transmit one or more uplink signals via first one or more antenna elements, the first one or more antenna elements selected by the UE based at least in part on the first one or more antenna element performance thresholds; and receive one or more downlink signals via second one or more antenna elements, the second one or more antenna elements selected by the UE based at least in part on the second one or more antenna element performance thresholds.

4. The UE of claim 1, wherein the one or more antenna element performance thresholds are based at least in part on a first size of a first antenna array of the UE, a second size of a second antenna array of a network entity, or both.

5. The UE of claim 1, wherein the one or more processors are individually or collectively further operable to execute the code to cause the UE to:

select the one or more antenna elements from a set of antenna element groups, wherein each antenna element group of the set of antenna element groups is associated with a same power characteristic.

6. The UE of claim 1, wherein, to receive the first indication, the one or more processors are individually or collectively operable to execute the code to cause the UE to:

receive the first indication via a radio resource control (RRC) message, a downlink control information (DCI) message, a medium access control-control element (MAC-CE) message, or any combination thereof.

7. The UE of claim 1, wherein, to transmit the second indication, the one or more processors are individually or collectively operable to execute the code to cause the UE to:

transmit the second indication via an RRC message, an uplink control information (UCI) message, a MAC-CE message, or any combination thereof.

8. The UE of claim 1, wherein the one or more processors are individually or collectively further operable to execute the code to cause the UE to:

select the one or more antenna elements based at least in part on an antenna element configuration at the UE.

9. The UE of claim 8, wherein the antenna element configuration is associated with a geometry of the one or more antenna elements of the UE, an arrangement of the one or more antenna elements of the UE, one or more boresight directions of the one or more antenna elements of the UE, a radio frequency integrated circuit (RFIC) configuration, a mapping between one or more RFIC ports and one or more feedlines associated with the one or more antenna elements of the UE, or any combination thereof.

10. The UE of claim 9, wherein the one or more antenna elements of the UE comprises one or more first sets of antenna elements, each first set of antenna elements associated with a respective plurality of boresight directions, and one or more second sets of antenna elements, each second set of antenna elements associated with a respective single boresight direction.

11. The UE of claim 1, wherein the one or more processors are individually or collectively further operable to execute the code to cause the UE to:

communicate with a network entity in accordance with the one or more TCI states based at least in part on transmitting the second indication.

12. The UE of claim 1, wherein the one or more processors are individually or collectively further operable to execute the code to cause the UE to:

receive a third indication from a network entity of one or more second TCI states, different from the one or more TCI states, based at least in part on transmitting the second indication; and communicate with the network entity in accordance with the one or more second TCI states based at least in part on receiving the third indication.

13. A network entity, comprising:

one or more memories storing processor-executable code; and one or more processors coupled with the one or more memories and individually or collectively operable to execute the code to cause the network entity to:

transmit a first indication of one or more antenna element selection parameters, the one or more antenna element selection parameters comprising one or more antenna element performance thresholds for antenna element selection by a user equipment (UE), wherein the one or more antenna element performance thresholds are associated with a feedline loss threshold, a blockage loss threshold, or both; and receive a second indication of one or more transmission configuration indicator (TCI) states based at least in part on transmitting the first indication, the one or more TCI states corresponding to usage of one or more antenna elements of the UE, wherein each TCI state of the one or more TCI states is associated with a respective spatial resource for communications via the one or more antenna elements.

14. The network entity of claim 13, wherein, to transmit the first indication, the one or more processors are individually or collectively operable to execute the code to cause the network entity to:

select the one or more antenna element performance thresholds based at least in part on a performance tradeoff between the blockage loss and the feedline loss, an antenna panel configuration supported by the UE, or both; and transmit the first indication of the one or more antenna element selection parameters based at least in part on the selecting.

15. The network entity of claim 13, wherein the one or more antenna element performance thresholds comprise first one or more antenna element performance thresholds for uplink communications and second one or more antenna element performance thresholds for downlink communications, and the one or more processors are individually or collectively further operable to execute the code to cause the network entity to:

receive one or more uplink signals based at least in part on the first one or more antenna element performance thresholds; and transmit one or more downlink signals based at least in part on the second one or more antenna element performance thresholds.

16. The network entity of claim 13, wherein the one or more antenna element performance thresholds are based at least in part on a first size of a first antenna array at the UE, a second size of a second antenna array at the network entity, or both.

17. The network entity of claim 13, wherein, to transmit the first indication, the one or more processors are individually or collectively operable to execute the code to cause the network entity to:

transmit the first indication via a radio resource control (RRC) message, a downlink control information (DCI) message, a medium access control-control element (MAC-CE) message, or any combination thereof.

18. The network entity of claim 13, wherein, to receive the second indication, the one or more processors are individually or collectively operable to execute the code to cause the network entity to:

receive the second indication via an RRC message, an uplink control information (UCI) message, a MAC-CE message, or any combination thereof.

19. The network entity of claim 13, wherein the one or more processors are individually or collectively further operable to execute the code to cause the network entity to:

communicate with one or more UEs including the UE in accordance with the one or more TCI states based at least in part on receiving the second indication.

20. The network entity of claim 13, wherein the one or more processors are individually or collectively further operable to execute the code to cause the network entity to:

transmit a third indication to the UE of one or more second TCI states, different from the one or more TCI states, based at least in part on receiving the second indication; and communicate with one or more UEs including the UE in accordance with the one or more second TCI states based at least in part on transmitting the third indication.

21. A method for wireless communications by a user equipment (UE), comprising:

receiving a first indication of one or more antenna element selection parameters, the one or more antenna element selection parameters comprising one or more antenna element performance thresholds for antenna element selection by the UE, wherein the one or more antenna element performance thresholds are associated with a feedline loss threshold, a blockage loss threshold, or both; and transmitting a second indication of one or more transmission configuration indicator (TCI) states corresponding to usage of one or more antenna elements of the UE, the one or more antenna elements selected by the UE based at least in part on the one or more antenna elements satisfying the one or more antenna element performance thresholds, wherein each TCI state of the one or more TCI states is associated with a respective spatial resource for communications via the one or more antenna elements.

22. The method of claim 21, further comprising:

selecting a first set of antenna elements based at least in part on the one or more antenna elements satisfying a first antenna element performance threshold associated with the feedline loss threshold; and selecting a second set of antenna elements different than the first set of antenna elements based at least in part on the one or more antenna elements satisfying a second antenna element performance threshold associated with the blockage loss threshold.

23. The method of claim 21, wherein the one or more antenna element performance thresholds comprise first one or more antenna element performance thresholds for uplink communications and second one or more antenna element performance thresholds for downlink communications, the method further comprising:

transmitting one or more uplink signals via first one or more antenna elements, the first one or more antenna elements selected by the UE based at least in part on the first one or more antenna element performance thresholds; and receiving one or more downlink signals via second one or more antenna elements, the second one or more antenna elements selected by the UE based at least in part on the second one or more antenna element performance thresholds.

24. The method of claim 21, further comprising:

selecting the one or more antenna elements based at least in part on an antenna element configuration at the UE.

25. The method of claim 24, wherein the antenna element configuration is associated with a geometry of the one or more antenna elements of the UE, an arrangement of the one or more antenna elements of the UE, one or more boresight directions of the one or more antenna elements of the UE, a radio frequency integrated circuit (RFIC) configuration, a mapping between one or more RFIC ports and one or more feedlines associated with the one or more antenna elements of the UE, or any combination thereof.

26. A method for wireless communications by a network entity, comprising:

transmitting a first indication of one or more antenna element selection parameters, the one or more antenna element selection parameters comprising one or more antenna element performance thresholds for antenna element selection by a user equipment (UE), wherein the one or more antenna element performance thresholds are associated with a feedline loss threshold, a blockage loss threshold, or both; and receiving a second indication of one or more transmission configuration indicator (TCI) states based at least in part on transmitting the first indication, the one or more TCI states corresponding to usage of one or more antenna elements of the UE, wherein each TCI state of the one or more TCI states is associated with a respective spatial resource for communications via the one or more antenna elements.

27. The method of claim 26, wherein transmitting the first indication comprises:

selecting the one or more antenna element performance thresholds based at least in part on a performance tradeoff between a blockage loss and a feedline loss, an antenna panel configuration supported by the UE, or both; and transmitting the first indication of the one or more antenna element selection parameters based at least in part on the selecting.

28. The method of claim 26, wherein the one or more antenna element performance thresholds comprise first one or more antenna element performance thresholds for uplink communications and second one or more antenna element performance thresholds for downlink communications, the method further comprising:

receiving one or more uplink signals based at least in part on the first one or more antenna element performance thresholds; and transmitting one or more downlink signals based at least in part on the second one or more antenna element performance thresholds.

* * * * *